(12) United States Patent
Barsoum et al.

(10) Patent No.: US 12,709,279 B2
(45) Date of Patent: Aug. 18, 2026

(54) INTELLIGENT ENERGY-EFFICIENCY COACH

(71) Applicant: PACCAR Inc, Bellevue, WA (US)

(72) Inventors: Raeef Hesham Wahib Barsoum, Bellingham, WA (US); Satvik Khuntia, Bellingham, WA (US); Steven Karl Jahns, Ferndale, WA (US); Ian Eric Roberts, Wooley, WA (US); David Leetz, Anacortes, WA (US)

(73) Assignee: PACCAR Inc, Bellevue, WA (US)

( * ) Notice: Subject to any disclaimer, the term of this patent is extended or adjusted under 35 U.S.C. 154(b) by 37 days.

(21) Appl. No.: 18/828,447

(22) Filed: Sep. 9, 2024

(65) Prior Publication Data

US 2026/0070564 A1 Mar. 12, 2026

(51) Int. Cl.
*B60W 40/09* (2012.01)
*B60W 50/14* (2020.01)

(52) U.S. Cl.
CPC ............ *B60W 40/09* (2013.01); *B60W 50/14* (2013.01); *B60W 2050/146* (2013.01)

(58) Field of Classification Search
None
See application file for complete search history.

(56) References Cited

U.S. PATENT DOCUMENTS 10,040,459 B1 * 8/2018 Kukreja ................. G07C 5/008
10,773,727 B1 * 9/2020 Ivanyi .................... B60K 35/10
11,407,428 B2 * 8/2022 Salles ............... B60W 60/0051
(Continued)

FOREIGN PATENT DOCUMENTS

AU 2017 200 782 B2 11/2018
CN 117842064 A * 4/2024 ................ B60S 3/04
(Continued)

OTHER PUBLICATIONS https://www.renaultgroup.com/en/magazine/energy-and-motorization/the-range-of-an-electric-car (11 pages), published Jun. 4, 2021.
(Continued)

*Primary Examiner* — Fekadeselassie Girma

(57) ABSTRACT

Systems and methods of providing intelligent energy-efficiency performance coaching. Energy efficiency performance is measured by a performance score calculated in association with various efficiency metrics. The performance score may be provided as feedback to the operator and may further be used by an operator reward system and/or gamification system. An intelligent energy-efficiency coach responds to variability in operator behaviors by using tunable variables to bias weighting constants assigned to the efficiency metrics to normalize calculations of performance scores. The intelligent energy-efficiency coach may use reinforcement machine learning techniques to calculate tunable variables and adjust performance scores on an ad hoc basis. A mutual learning process may be performed, where the operator may learn energy saving behaviors from feedback provided by the intelligent energy-efficiency coach to improve energy efficiency and the intelligent energy-efficiency coach adjusts tunable variables to help the operator improve their energy efficiency performance.

20 Claims, 11 Drawing Sheets

(56) References Cited

U.S. PATENT DOCUMENTS

| | | | | |
|---|---|---|---|---|
| 11,479,258 | B1 * | 10/2022 | Sanchez | B60W 40/08 |
| 11,681,296 | B2 * | 6/2023 | Tebbens | B60W 40/09 701/25 |
| 12,026,729 | B1 * | 7/2024 | Sanchez | G06N 5/04 |
| 12,056,722 | B1 * | 8/2024 | Sanchez | G06Q 30/0201 |
| 12,252,147 | B2 * | 3/2025 | Ewert | B60W 50/029 |
| 12,351,063 | B2 * | 7/2025 | Bennett | B60L 3/0069 |
| 2014/0278574 | A1 * | 9/2014 | Barber | B60W 40/09 705/4 |
| 2015/0106289 | A1 * | 4/2015 | Basir | B60K 35/85 705/325 |
| 2016/0244067 | A1 * | 8/2016 | Hunt | B60W 30/143 |
| 2016/0368508 | A1 * | 12/2016 | Manci | B60W 50/0205 |
| 2018/0244288 | A1 * | 8/2018 | Glaser | B60W 40/08 |
| 2021/0224917 | A1 * | 7/2021 | Gaudin | G06Q 40/08 |
| 2022/0176971 | A1 | 6/2022 | Nordh | |
| 2023/0331247 | A1 * | 10/2023 | Wurmsdobler | B60W 50/14 |
| 2024/0194003 | A1 * | 6/2024 | Reed | G06Q 30/0645 |
| 2024/0286643 | A1 * | 8/2024 | Ucar | G06N 20/00 |
| 2024/0400060 | A1 * | 12/2024 | Subosits | B60W 40/09 |
| 2025/0058793 | A1 * | 2/2025 | Li | B60W 30/18163 |
| 2025/0121845 | A1 * | 4/2025 | Rosman | B60W 50/14 |
| 2025/0259487 | A1 * | 8/2025 | Peduzzi | G07C 5/0816 |
| 2025/0296580 | A1 * | 9/2025 | Sharma | B60W 50/0205 |

FOREIGN PATENT DOCUMENTS

| | | | | |
|---|---|---|---|---|
| EP | 4 708 257 | A1 | 3/2026 | |
| WO | WO-2023023214 | A1 * | 2/2023 | G06Q 40/08 |

OTHER PUBLICATIONS

Walsh et al. "Electric vehicle driving style and duty variation performance study" (Cenex, 2010), pp. 1-11.

https://www.greencarreports.com/news/1130841_vw-explains-how-the-id-4-electric-suv-gets-smart-about-coasting (17 pages), retrieved Jul. 1, 2025.

Bingham et al, "Impact of driving characteristics on electric vehicle energy consumption and range", IET Intell. Transp. Syst., 2012, 6, (1), pp. 29-35.

Cocron et al. "Energy recapture through deceleration—regenerative braking in electric vehicles from a user perspective", Ergonomics, 2013, 56, (8), pp. 1203-1215.

Franke et al. "Adapting to the range of an electric vehicle—the relation of experience to subjectively available mobility resources" Proc. of the European Conf. on Human Centred Design for Intelligent Transport Systems, Valencia, Spain, Jun. 14-15, 2012, pp. 95-103.

Pichelmann et al. "The timeframe of adaptation to electric vehicle range", in Kurosu M. (Ed.): 'Human-computer interaction. Applications and services, LNCS 8005' ( Springer, 2013, 1st edn.) pp. 612-620.

Extended European Search Report for European Patent Application No. 25191474.3 mailed Dec. 12, 2025, 13 pages.

Massoud, R. et al., "Eco-driving Profiling and Behavioral Shifts Using IoT Vehicular Sensors Combined with Serious Games", 2019 IEEE Conference on Games (COG), IEEE, Aug. 20, 2019, pp. 1-8, XP033621277 (retrieved on Sep. 24, 2019).

* cited by examiner

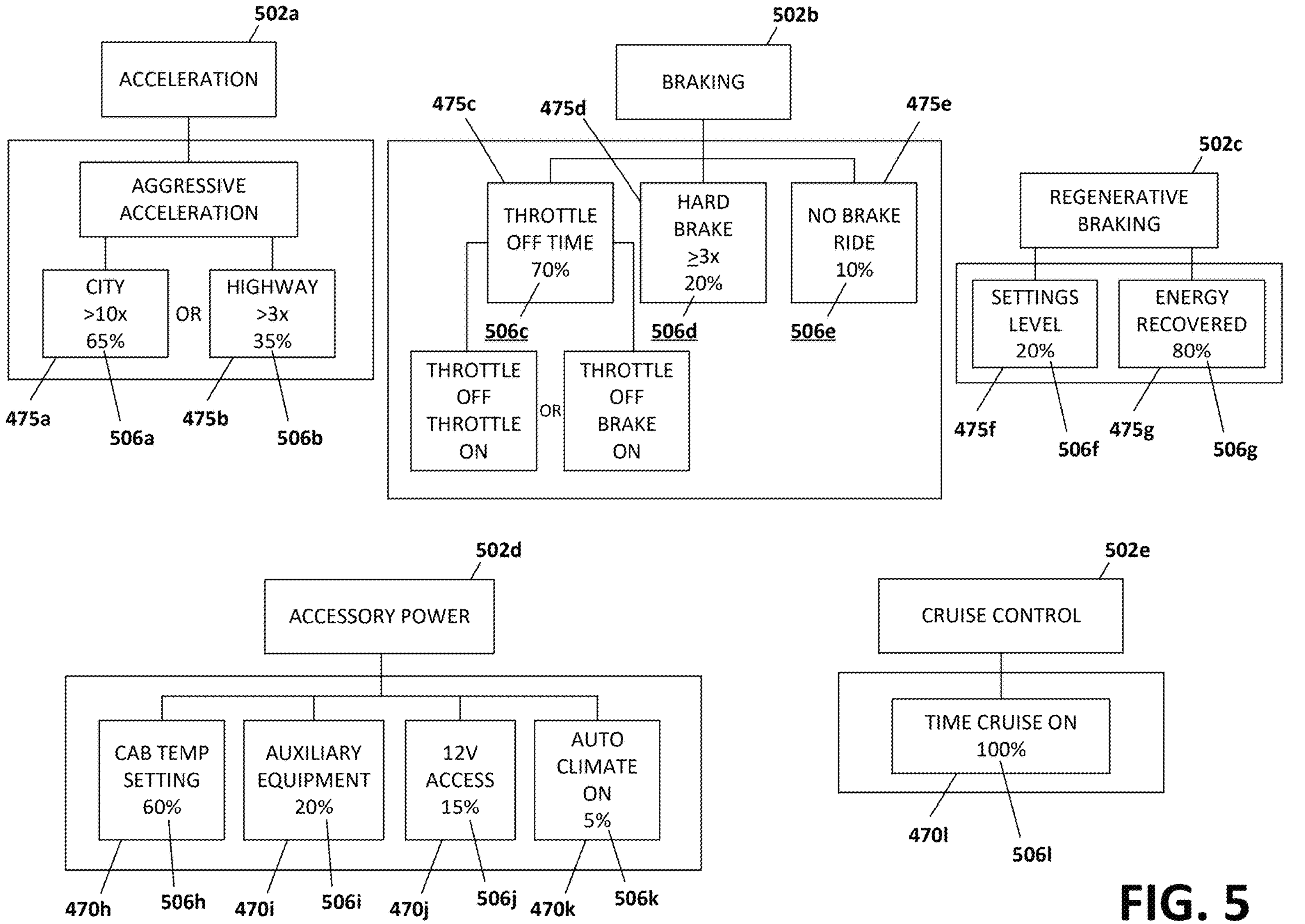
502a
ACCELERATION
AGGRESSIVE ACCELERATION
CITY >10x 65%
OR
HIGHWAY >3x 35%
475a
506a
475b
506b
502b
BRAKING
475c
475d
475e
THROTTLE OFF TIME 70%
HARD BRAKE ≥3x 20%
NO BRAKE RIDE 10%
506c
506d
506e
THROTTLE OFF THROTTLE ON
OR
THROTTLE OFF BRAKE ON
502c
REGENERATIVE BRAKING
SETTINGS LEVEL 20%
ENERGY RECOVERED 80%
475f
506f
475g
506g
502d
ACCESSORY POWER
CAB TEMP SETTING 60%
AUXILIARY EQUIPMENT 20%
12V ACCESS 15%
AUTO CLIMATE ON 5%
470h
506h
470i
506i
470j
506j
470k
506k
502e
CRUISE CONTROL
TIME CRUISE ON 100%
470l
506l
FIG. 5

INTELLIGENT ENERGY-EFFICIENCY COACH

BACKGROUND

Operator behavior impacts energy efficiency of a vehicle, and consequently the travel range. Technologies, such as energy-efficiency performance feedback, inform the operator about how their behaviors impact energy efficiency, which can help to modify operator behavior and enhance operator performance that improves energy efficiency of the vehicle.

In some cases, such as when the vehicle is part of a fleet of vehicles, operator behavior that improves energy efficiency may be rewarded by the fleet (e.g., via speed adjustments or other incentives) to encourage energy efficient operator behaviors. However, to provide equitable rewards, scoring of various operator behaviors may need to be normalized to adjust for different behaviors that may be influenced by factors outside the operator's control, such as configuration of the vehicle, environmental factors, and/or geographic factors. Additionally, a driving style characteristic, such as following distance, may differ from one region (e.g., where roads are smaller and more congested with frequent traffic jams) to another region (e.g., where roads are wider, less crowded, and where traffic flows more smoothly).

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This disclosure generally relates to providing intelligent energy-efficiency performance coaching. An intelligent energy-efficiency coach may be implemented in a vehicle to evaluate operator behaviors using various efficiency metrics and provide feedback about the impact of operator behaviors on energy efficiency performance. To improve the efficacy of the feedback, the intelligent energy-efficiency coach captures various factors and establishes a baseline against which progressive improvements can be measured. This responsiveness to the particular operator, specific vehicle, and use conditions enhances validity of feedback provided to the operator and receptivity to it. Operator behaviors may be evaluated using various efficiency metrics corresponding to various factors that impact energy efficiency of the vehicle (e.g., acceleration, braking, regenerative braking, accessory power usage, and cruise control usage). In some examples, energy efficiency performance is measured by a performance score determined using metric sub-scores that are calculated in association with the efficiency metrics. The performance score may be provided as feedback to the operator and may further be used by an operator reward system to reward operators for desirable operator behaviors or positive energy efficiency results. In some examples, performance scores are used in a gamification strategy or system implemented across multiple vehicles within a fleet.

According to an aspect, operator behavior may be influenced by different vehicle configurations, environmental factors, varying infrastructures, driving styles (e.g., influenced by driving trends in different regions or a particular drive cycle). Thus, a same method of scoring operator behavior performance corresponding to energy efficiency across different vehicle types, vehicle operators, and/or operating conditions may not be equitable. Accordingly, scoring may need to be normalized so that individual operators are not penalized because of their vehicle configurations, weather, traffic, and/or route conditions, etc.

In examples, the intelligent energy-efficiency coach responds to variability in operator behaviors by using tunable variables to bias weighting constants assigned to the efficiency metrics to normalize calculations of performance scores. In some examples, the tunable variables are determined based on information related to the vehicle, operation of the vehicle, and/or the environment in which the vehicle is operating. Thus, using tunable variables to bias weighting constants normalizes the impact of factors outside the operator's control. The intelligent energy-efficiency coach may use reinforcement machine learning techniques to calculate tunable variables and adjust performance scores on an ad hoc basis. A mutual learning process may be performed, where the operator may learn energy saving behaviors from feedback provided by the intelligent energy-efficiency coach to improve energy efficiency and the intelligent energy-efficiency coach adjusts tunable variables to help the operator improve their energy efficiency performance. This mutual learning process may allow both the operator and the intelligent energy-efficiency coach to adapt and improve over time. For instance, progressive feedback may be used to gently encourage the operator to improve behaviors that impact energy efficiency against a baseline, as opposed to a "one size fits all" approach. In examples, the intelligent energy-efficiency coach may be adaptable for various vehicles, operators, and locations.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures:

FIG. 5 is a diagram of various operator behaviors that may be evaluated for determining energy-efficiency performance according to an example;

DETAILED DESCRIPTION

Figure 1:
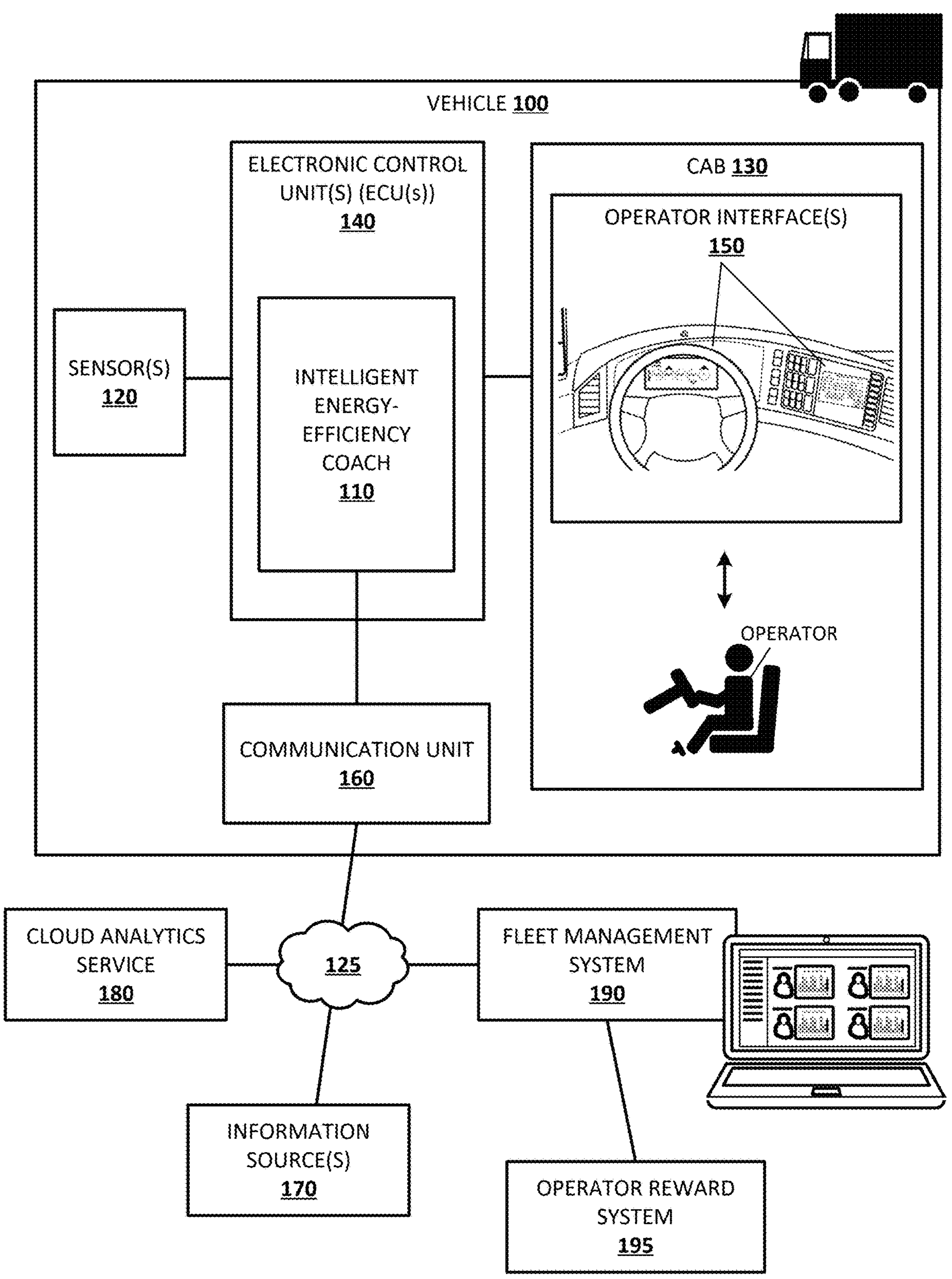
FIG. 1 is a diagram of a vehicle in which an intelligent energy-efficiency coach may be implemented according to an example.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. The following detailed description is, therefore, not to be taken in a limiting sense.

The present disclosure relates to systems and methods of providing intelligent energy-efficiency coaching according to examples. An intelligent energy-efficiency coach may be implemented in a vehicle to determine how behaviors of an operator impact energy consumption of a vehicle and to provide feedback to the operator that informs the operator of the impact of the operator behaviors. In some implementations, the intelligent energy-efficiency coach determines how operator behavior impacts energy consumption of the vehicle. Operator behaviors may be evaluated using various efficiency metrics corresponding to various factors that impact energy efficiency of the vehicle. For instance, factors such as acceleration, braking, regenerative braking, accessory power usage, and cruise control usage may impact the vehicle's overall energy efficiency in association with longitudinal control, energy recuperation, and/or auxiliary energy usage. In examples, energy efficiency may be fuel efficiency, electrical efficiency, or a combination thereof.

In some implementations, a performance score is determined using metric sub-scores that are calculated in association with the efficiency metrics. The performance score may be provided as feedback to the operator and may further be used by an operator reward system to reward operators for desirable operator behaviors or positive energy efficiency results. According to an aspect, operator behavior may be influenced by different vehicle configurations, environmental factors, varying infrastructures, driving styles (e.g., influenced by driving trends in different regions or particular drive cycle). Thus, a same method of scoring operator behavior across different vehicle types and/or vehicle operators may not be equitable. Accordingly, the intelligent energy-efficiency coach responds to variability in operator behaviors by establishing a baseline against which progressive improvements can be made. Additionally, the coach uses tunable variables to bias weighting constants assigned to the efficiency metrics to normalize calculations of performance scores. In some examples, the tunable variables are determined based on information related to the vehicle, operation of the vehicle, and/or the environment in which the vehicle is operating. The intelligent energy-efficiency coach may use reinforcement learning techniques (e.g., temporal differencing (TD) and n-step TD) to calculate tunable variables and adjust performance scores on an ad hoc basis. This responsiveness to the particular operator, specific vehicle, and use conditions enhances validity of feedback provided to the operator and receptivity to it.

An aspect of the present disclosure includes a system for providing energy-efficiency coaching, comprising: at least one processing unit; and a memory including instructions, which when executed by the at least one processing unit, cause the system to perform operations comprising: receiving operator behavior data corresponding to operator behaviors performed throughout a drive cycle of a vehicle that impact the vehicle's energy efficiency; evaluating the operator behavior data at a first interval of the drive cycle based on a set of efficiency metrics to identify behaviors of interest performed by an operator of the vehicle; calculating a first set of metric sub-scores for the set of efficiency metrics for the first interval based on identified behaviors of interest; determining a first set of tunable variables for the set of efficiency metrics; applying the first set of tunable variables and a set of weighting constants to the first set of metric sub-scores to generate a first set of weighted metric sub-scores for the first interval; calculating a first performance score for the first interval based on the first set of weighted metric sub-scores; and providing a first set of feedback based on the first performance score for the first interval.

Another aspect of the present disclosure includes a method for providing energy-efficiency coaching, comprising: receiving operator behavior data corresponding to operator behaviors performed throughout a drive cycle of a vehicle that impact the vehicle's energy efficiency; evaluating the operator behavior data at a first interval of the drive cycle based on a set of efficiency metrics to identify behaviors of interest performed by an operator of the vehicle; calculating a first set of metric sub-scores for the set of efficiency metrics for the first interval based on identified behaviors of interest; determining a first set of tunable variables for the set of efficiency metrics; applying the first set of tunable variables and a set of weighting constants to the first set of metric sub-scores to generate a first set of weighted metric sub-scores for the first interval; calculating a first performance score for the first interval based on the first set of weighted metric sub-scores; and providing a first set of feedback based on the first performance score for the first interval.

Yet another aspect of the present disclosure includes a vehicle, comprising an intelligent energy-efficiency coach, comprising: at least one processing unit; and a memory including instructions, which when executed by the at least one processing unit, cause the system to perform operations comprising: receiving operator behavior data corresponding to operator behaviors performed throughout a drive cycle of a vehicle that impact the vehicle's energy efficiency; evaluating the operator behavior data at a first interval of the drive cycle based on a set of efficiency metrics to identify behaviors of interest performed by an operator of the vehicle; calculating a first set of metric sub-scores for the set of efficiency metrics for the first interval based on identified behaviors of interest; determining a first set of tunable variables for the set of efficiency metrics; applying the first set of tunable variables and a set of weighting constants to the first set of metric sub-scores to generate a first set of weighted metric sub-scores for the first interval; calculating a first performance score for the first interval based on the first set of weighted metric sub-scores; and providing a first set of feedback to the operator including the first performance score for the first interval.

FIG. 1 is a schematic diagram of a vehicle 100 in which intelligent energy-efficiency coaching may be implemented according to examples of the present disclosure. In some implementations, the vehicle 100 is a truck, such as a Class 8 truck. The truck may be connected to a trailer by a trailer coupling, such as, for example, a "fifth wheel," to form a tractor-trailer combination. However, the methods and systems can be used by vehicles 100 of different types and/or sizes. For instance, aspects of the disclosed subject matter may have wide application and, therefore, may be suitable for use with other types of vehicles, such as passenger vehicles, buses, light, medium, and heavy-duty vehicles, motor homes, etc. Accordingly, the following descriptions and illustrations herein should be considered illustrative in nature and, thus, not limiting of the scope of the claimed subject matter.

In some implementations, the vehicle 100 is included in a fleet of vehicles owned, operated, and/or managed by a single organization, company, government agency, etc., (referred to herein as a fleet entity). In examples, the vehicle 100 and the other vehicles in the fleet may be assembled to serve a common purpose or function (e.g., transportation of goods, personnel, public transportation, delivery services, emergency services). In further examples, the fleet entity includes a fleet management system 190 operating on and/or including a computing device (e.g., of a back-office). In examples, the fleet management system 190 is a software system that allows the fleet entity to manage, organize, and coordinate fleet vehicles from a central information system. The fleet management system 190 may be used to manage various aspects of vehicle operation, such as maintenance, energy consumption, vehicle operator (e.g., driver) management, safety management, vehicle tracking, route planning, etc. In some implementations, the fleet management system 190 includes or is in communication with an operator reward system 195 that provides performance bonuses, such as increased permitted speed (e.g., to a pedal speed limit and/or cruise control speed limit), monetary, or other incentives, to reward operators for desirable operator behaviors or positive energy efficiency results. In some examples, the operator reward system 195 provides a gamification strategy or system that encourages competitive performance and efficiency among multiple vehicles 100 within the fleet. In some implementations, the operator reward system 195 may be implemented, at least in part, locally on the vehicle 100.

The vehicle 100 (and other vehicles in the fleet) may include a communications unit 160 including one or more communication interfaces for establishing connections with cloud-based servers or services via one or a combination of networks 125 (e.g., cellular networks, Wi-Fi, and/or other connectivity options). For instance, the communications unit 160 may allow the vehicle 100 (and other vehicles in the fleet) to communicate with the fleet management system 190, a cloud analytics service 180, one or more information sources 170, and/or other endpoints via the established connections. In examples, the communications unit 160 may include one or a combination of a telematics control unit (TCU), vehicle to network (V2N) technology, automotive ethernet, a wireless modem, an embedded or tethered system, etc.

As depicted in FIG. 1, the vehicle 100 includes a cabin (referred to herein as a cab 130) attached to a frame where one or more occupants (e.g., an operator and/or passengers) may be seated or positioned and may be a primary zone where the operator interacts with various controls to drive the vehicle 100. In some examples, the cab 130 furthers include a sleeper compartment attached to the cab 130 that may provide various resting and sleeping accommodations for vehicle occupants. According to examples, one or more operator interfaces 150 are included in the cab 130 to communicate information to the operator via operator feedback that is provided live (e.g., in real time or near-real time), pre-trip, and/or post-trip. The one or more operator interfaces 150 may include a dashboard display, an infotainment screen, a warning light, a warning indicator, and/or a combination of interfaces.

In some examples, propulsion for the vehicle 100 may be provided by an internal combustion engine. In other examples, the vehicle 100 is an electric vehicle (EV), such as a battery electric vehicle (BEV), a plug-in hybrid electric vehicle (PHEV), a hybrid electric vehicle (HEV), a fuel cell electric vehicle (FCEV), etc., including one or more electric motors for propulsion. For instance, the electric motors convert electrical energy supplied by a rechargeable battery, an internal combustion engine, and/or a hydrogen fuel cell into mechanical energy to propel the vehicle 100. In addition to propulsion, various other systems of the vehicle 100 may rely on electrical energy for operation, such as one or more heating, ventilation, and air conditioning (HVAC) systems used to provide climate control of the cab 130, trailer, battery, etc., infotainment and communication systems, instrumentation and controls, lighting, charging ports, safety systems, power steering, regenerative braking, a battery charging system, a battery management system (BMS) of the battery, auxiliary equipment or attachments (e.g., external components or machinery via electric power take-off (ePTO)), etc.

The vehicle 100 includes a plurality of axles comprising at least one drive axle powered by the one or more electric motors and/or internal combustion engine to propel the vehicle 100. Each axle is coupled to at least one pair of wheels onto which tires are mounted that interact with a driving surface. The vehicle 100 may have one of various axle and drive axle configurations (e.g., 6×4, 4×2, 8×4, 6×2). In some examples, the vehicle 100 is equipped with a selectable drive system to engage or disengage additional drive axles and wheels. In addition to other factors (e.g., traction, load-carrying capacity, and maneuverability), the axle/drive axle configuration has an impact on the vehicle's energy efficiency.

Various sensors 120 included in the vehicle 100 collect and provide data to one or more electronic control units (ECUs) 140 that manage and control various systems and subsystems of the vehicle 100. Example sensors 120 include wheel speed sensors, engine speed sensors, temperature sensors, pressure sensors, slope sensors, weight sensors, cameras, accelerometers, Radar, LiDAR (Light Detection and Ranging), GPS (Global Positioning System), ABS (Anti-lock Braking System) sensors, stability control system sensors, and/or other devices that monitor different aspects of operation of the vehicle, operator's behavior, and/or environment. In some implementations, the sensors 120 collect data corresponding to operator behavior (e.g., longitudinal control, accessory power usage, regenerative braking activation) as well as other inputs (e.g., environmental data, such as weather, topography and traffic).

In some implementations, the vehicle 100 includes one or more ECUs 140 that operate and provide increased performance, efficiency, and/or safety. The ECUs 140 can be implemented in a variety of hardware, software, and combined hardware/software configurations for carrying out aspects of the present disclosure. For example, the ECUs 140 may include memory and a processor. In one embodiment, the memory comprises a random-access memory ("RAM") and an electronically erasable, programmable, read-only memory ("EEPROM"), or other non-volatile memory (e.g., flash memory) or persistent storage. The RAM may be a volatile form of memory for storing program instructions that are accessible by the processor. The processor is configured to operate in accordance with program instructions. The memory may include program modules, applications, instructions, and/or the like that are executable by the processor and implement functionality described herein.

At least one ECU 140 includes an intelligent energy-efficiency coach 110 that monitors operator behaviors that impact energy efficiency and quantifies the impact on energy efficiency based on defined efficiency factor metrics. In examples, various aspects of the vehicle's operation affected by operator behavior that are contributing factors to the vehicle's overall energy efficiency are defined as efficiency factors. Example efficiency factors include acceleration, braking, regenerative braking, accessory power usage, and cruise control usage, where the energy impact to the vehicle's overall energy efficiency may be related to longitudinal control, energy recuperation, fuel usage, or auxiliary energy usage. For instance, smoother acceleration and braking may generally result in better energy efficiency, while regenerative braking may allow the vehicle 100 to recover some of the energy that would otherwise be lost during braking. Additionally, use of a cruise control system may help to optimize power usage, while use of various accessories or equipment on the vehicle 100 may negatively impact the vehicle's energy efficiency.

According to an aspect, throughout an operation/drive cycle (e.g., a charge cycle, a trip from a starting point to a destination, an operator shift, a distance, a time period) operator behavior data is collected and evaluated using a set of criteria (referred to herein as operator behaviors of interest), which may be predefined for each efficiency factor. At predetermined intervals (e.g., time or distance), behaviors of interest that are monitored in operator behavior data are scored using an acceleration efficiency metric, a braking efficiency metric, a regenerative braking efficiency metric, an accessory power efficiency metric, and a cruise control efficiency metric. Each behavior of interest may correspond to one or a series of operator actions that the intelligent energy-efficiency coach 110 is operative to detect and quantify. Example behaviors of interest may correspond to when/how often the operator accelerates aggressively versus smoothly, how often or hard the operator brakes, energy recuperation from regenerative braking, energy usage from accessory power usage, and/or how consistently the operator uses cruise control.

In some examples, the intelligent energy-efficiency coach 110 monitors operator behavior data for behaviors of interest and provides live (e.g., instantaneous) performance feedback to the operator of the vehicle 100 in real time (near-real time) when a behavior of interest is detected. The live performance feedback may indicate a positive impact or negative impact the detected behavior of interest has on energy efficiency relative to an efficiency metric. For instance, activating the cruise system may trigger the intelligent energy-efficiency coach 110 to provide live performance feedback indicating a positive impact relative to the cruise control efficiency metric. In another example, repeated aggressive acceleration may trigger the intelligent energy-efficiency coach 110 to provide live performance feedback indicating a negative impact of the operator action relative to the acceleration efficiency metric.

In some examples, the intelligent energy-efficiency coach 110 records identified operator behaviors of interest that occur within an interval and scores the behaviors of interest to calculate a metric sub-score for each efficiency metric for the interval. The metric sub-scores calculated for the interval may be averaged or otherwise normalized to generate an interval performance score. In some examples, the interval performance score is a weighted average score. In examples, a drive cycle (e.g., a charge cycle, a trip from a starting point to a destination, an operator shift, a shift for a team of operators, a distance, a time period) is comprised of a plurality of intervals. Metric sub-scores calculated for each efficiency metric over the drive cycle may be averaged or otherwise normalized to generate cumulative metric sub-scores for the efficiency metrics. In some examples, a drive-cycle performance score is determined based on an average of metric sub-scores calculated for the plurality of intervals in the drive cycle. According to examples, the intelligent energy-efficiency coach 110 may further generate and provide feedback corresponding to interval-based and/or drive cycle-based performance. For instance, one or a combination of (interval) metric sub-scores, an interval performance score, cumulative (drive-cycle) metric sub-scores, a drive-cycle performance score, historical (multi-drive cycle), recommendations, etc., are presented to the vehicle operator and/or transmitted to an operator reward system 195, cloud analytics service 180, and/or to a fleet management system 190. The performance feedback provides information about how operator behaviors are impacting energy efficiency of the vehicle 100 across defined efficiency metrics and is described in further detail below.

Figure 2:
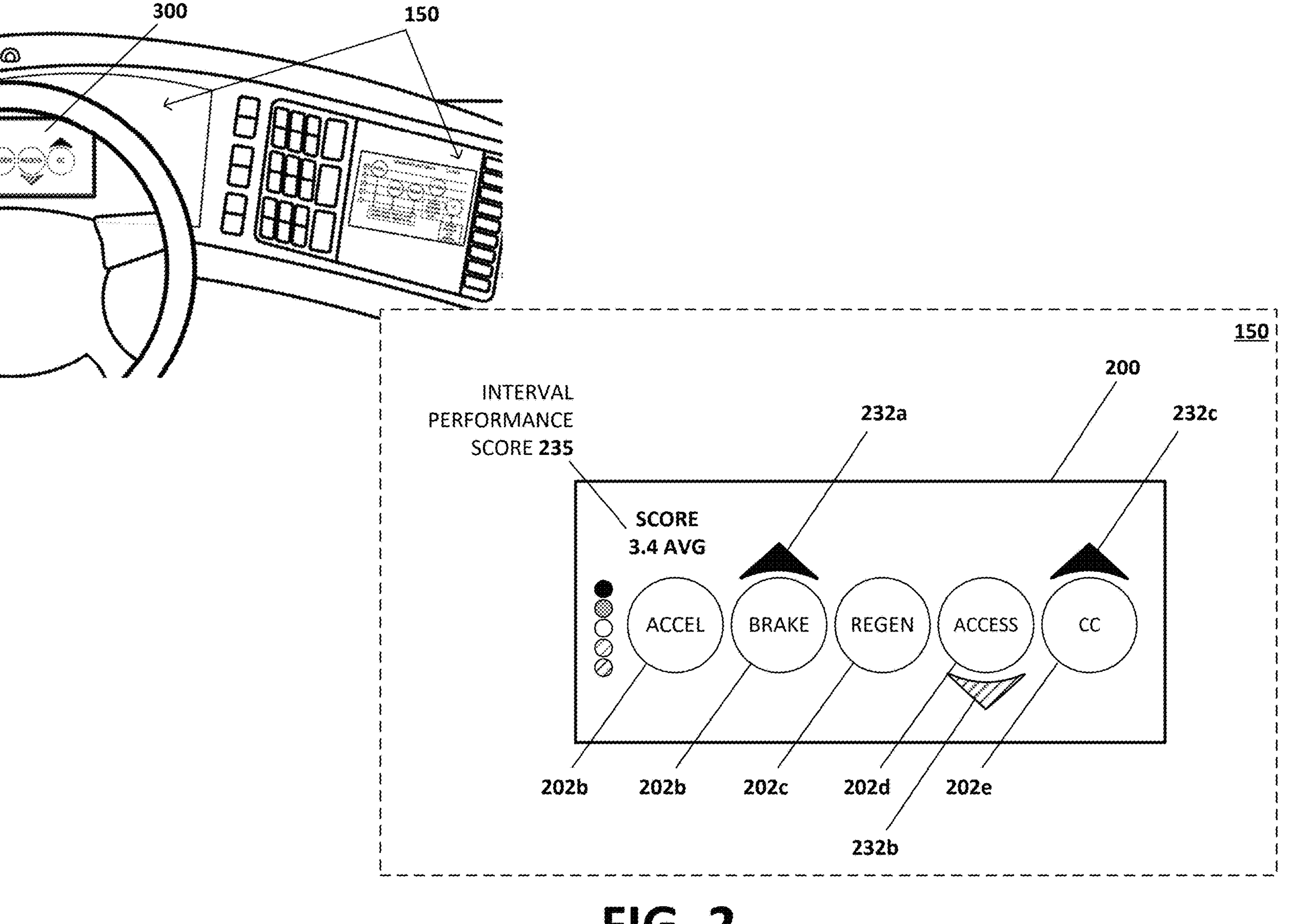
FIG. 2 is an illustration of performance feedback that may be provided to an operator of the vehicle according to an example.

With reference now to FIG. 2, examples of energy-efficiency performance feedback provided by the intelligent energy-efficiency coach 110 are depicted. Energy-efficiency performance feedback includes outputs 430 (depicted in FIG. 4) of the intelligent energy-efficiency coach 110 and may be provided to the operator of the vehicle 100 via one or more user interfaces (UIs) presented by one or more operator interfaces 150. For instance, the example UI 200 depicted in FIG. 2 may display energy-efficiency performance feedback that is viewable by the operator while operating (e.g., driving) the vehicle 100. In some examples, the UI 200 may be displayed continually while the vehicle 100 is being driven. In some implementations, energy-efficiency performance feedback presented in the UI 200 includes instantaneous performance feedback provided in real time (near-real time) to the operator in response to detecting specific operator behaviors of interest when evaluating collected operator behavior data. In other implementations, energy-efficiency performance feedback presented in the UI 200 includes cumulative performance feedback provided at the end of an interval.

In some examples, instantaneous performance feedback may include one or more instantaneous feedback indicators **232*a*-232*c* (collectively, instantaneous feedback indicators 232) that provide a visual indication of a positive impact or negative impact of one or more detected operator behaviors of interest on one or more efficiency metrics. In some examples, an instantaneous feedback indicator 232 is presented as an upward- or downward-pointing arrow in association with a corresponding representation of the efficiency metric (i.e., efficiency metric representation 202*a*-202*e* (collectively, efficiency metric representation 202)). For instance, a first instantaneous feedback indicator 232*a* is depicted as an upward-pointing arrow above a braking efficiency metric representation 202*b*. This instantaneous performance feedback may be presented in response to detection of a positive behavior of interest, such as a detected "throttle-off" state corresponding to an operator action of releasing the throttle (e.g., where minimal energy may be consumed to maintain the vehicle's motion). As another example, a second instantaneous feedback indicator 232*b* is depicted as a downward-pointing arrow below an accessory power efficiency metric representation 202*d*. This instantaneous performance feedback may be presented in response to detection of a negative behavior of interest, such as detected excess use of 12-volt (V) accessory power. As yet another example, activating the cruise control system may be detected and represented as an upward-pointing arrow above the cruise control efficiency metric representation 202*e*. In some examples, the instantaneous feedback indicators 232 are displayed in a particular color or shading to indicate a level of energy impact of a detected operator behavior of interest. In some examples, the instantaneous feedback indicators 232 are displayed a particular distance from (e.g., above or below) the efficiency metric representation 202 to indicate the level energy impact of the detected operator action. In some implementations, instantaneous feedback indicators 232** are presented for a calibratable time period (e.g., 2-3 seconds).

In some implementations, an average score of performance for each efficiency metric (e.g., a metric sub-score) is calculated for each interval. For instance, the intelligent energy-efficiency coach 110 uses the operator behavior measures to evaluate operator behavior data collected over an interval to calculate the metric sub-scores for that interval. An interval may be based on distance (e.g., 5 miles (mi), 10 mi, 10 kilometers (km) 15 km) or time (e.g., 5 minutes (min), 10 min, 15 min). In some examples, a composite interval performance score 235 is determined based on an average of the metric sub-scores calculated in an interval and presented in the UI 200. In further examples, the interval performance score 235 is a weighted average score. For instance, each efficiency metric may have an assigned weighting constant corresponding to its relative influence on the interval performance score 235. In yet further examples, the weighting constants are biased by a tunable variable.

In some implementations, performance feedback provided in the UI 200 further includes visual indications of the metric sub-scores calculated in the last interval. In some examples, the interval metric sub-scores are visually indicated using one or more attributes of the efficiency metric representations 202. For instance, the color, size, and/or position of an efficiency metric representation 202 may be adjusted corresponding to the last-calculated metric sub-score for that efficiency metric, providing a visual indication of the operator's efficiency performance in association with the efficiency metric over the last interval. As an example, a metric sub-score for an efficiency metric may be graphically indicated by displaying the corresponding efficiency metric representation 202 in a specific color or size, moving the efficiency metric representation 202 along a visible or invisible vertical scale, or adjusting another attribute of the efficiency metric representation 202. In some examples, the last-calculated metric sub-scores may be displayed in association with the corresponding efficiency metric representations 202. In some implementations, the visual indications of the metric sub-scores represent weighted metric sub-scores (e.g., where the metric sub-scores are weighted by their corresponding weighting constant). In other examples, the visual indications of the metric sub-scores represent normalized metric sub-scores (e.g., where the weighting constant of one or more efficiency metrics is biased by a tunable variable).

In some implementations, feedback provided in the UI 200 represents calculations over more than one interval. For instance, the interval performance score 235 may be a weighted average of the metric sub-scores calculated for the efficiency metrics over a plurality of intervals (e.g., a last "n" intervals, intervals of a current drive cycle, intervals of a last drive cycle, intervals of a last "n" drive cycles, or intervals of all drive cycles performed by a particular operator, where "n" represents an integer greater than 1). As another example, the visual indications of the metric sub-scores may each represent the average of the metric sub-scores calculated for a corresponding efficiency metric over a plurality of intervals. In some implementations, the operator may be provided with various UIs from which the operator may select to display different performance feedback in one or more operator interfaces 150. For instance, the operator may be able to select between display of interval-based performance feedback or drive cycle-based performance feedback.

Figure 3:
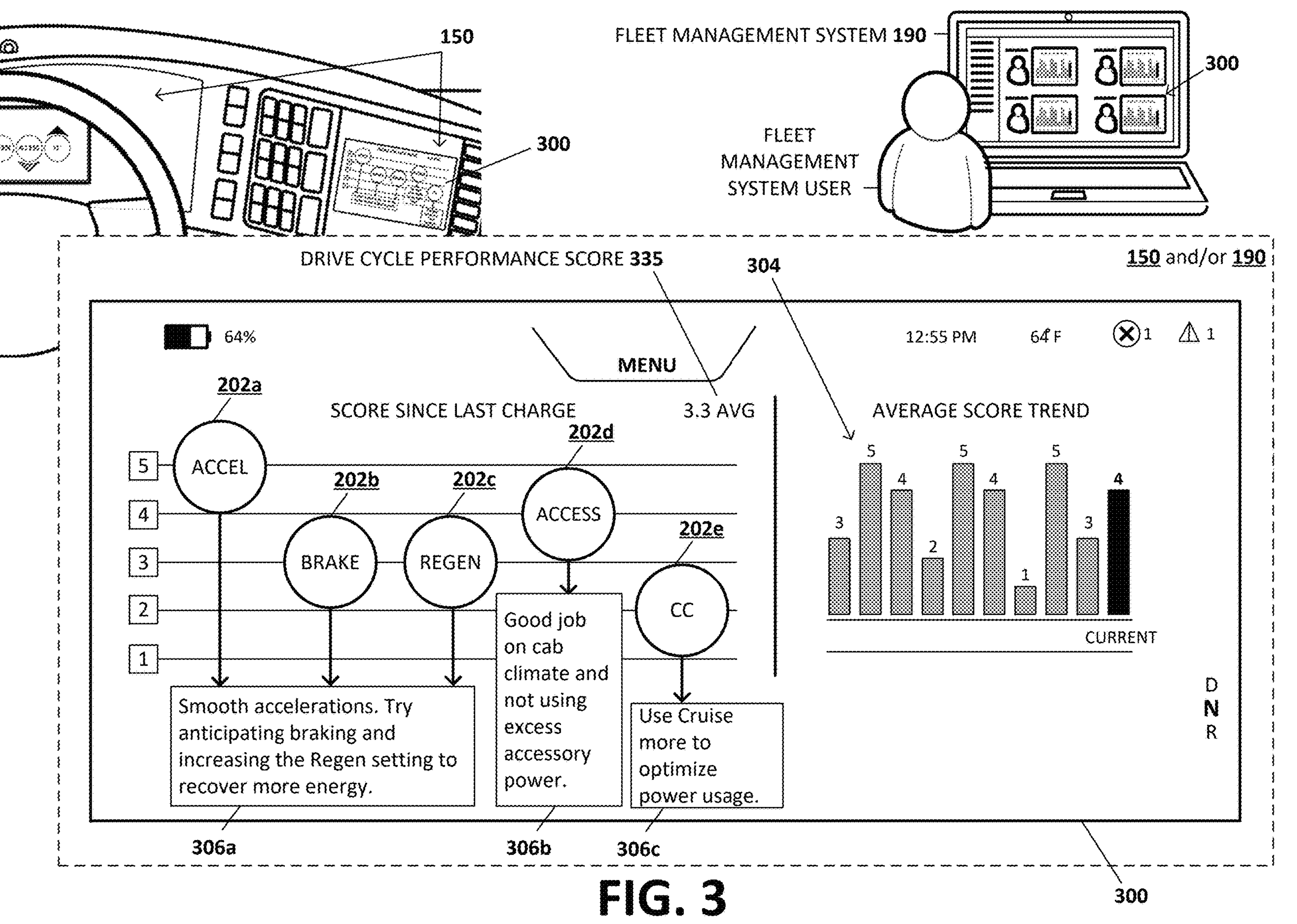
FIG. 3 is another illustration of performance feedback that may be provided to the operator of the vehicle according to another example.

With reference now to FIG. 3, another example UI 300 is depicted that may be displayed in one or more operator interfaces 150 and used to present performance feedback (e.g., including outputs 430 (depicted in FIG. 4) of the intelligent energy-efficiency coach 110) to the vehicle operator. In some examples, the UI 300 may include drive cycle and/or multi-drive cycle-performance feedback. However, in other examples, the performance feedback may be interval-based. Drive cycle-based performance feedback may be based on efficiency metric calculations of a current drive cycle (e.g., since the battery of the vehicle 100 was last recharged), over multiple drive cycles (e.g., a last "n" drive cycles or all drive cycles performed by a particular operator), etc. The UI 300 may be navigated to and/or presented at predetermined events, such as key-on events (e.g., before initiating vehicle to a state of "ready-to-move"), key-off events (e.g., when the vehicle is stopped or parked), and/or during charging. In other examples, one or more elements of the example performance feedback shown in FIG. 3 may be included in a UI presented to a fleet management system user by the fleet management system 190.

In some implementations, drive-cycle performance feedback includes indications of cumulative (drive-cycle) metric sub-scores for each efficiency metric (e.g., an average of metric sub-scores calculated for the efficiency metric over the drive cycle). In examples, efficiency metric representations 202 corresponding to the efficiency metrics are displayed on a vertical scale, where positioning of the efficiency metric representations 202 in association with the vertical scale corresponds to the efficiency metric's cumulative metric sub-score. Positions of the efficiency metric representations 202 may be adjusted up or down the vertical scale based on the latest calculated metric sub-scores. In some examples, the cumulative metric sub-scores represented in the UI 300 correspond to unweighted metric sub-scores. In other examples, the cumulative metric sub-scores represented in the UI 300 correspond to weighted metric sub-scores. In yet other examples, the cumulative metric sub-scores represent normalized metric sub-scores.

In some implementations, energy-efficiency performance feedback presented in the UI 300 further includes a drive-cycle performance score 335. The drive-cycle performance score 335 may represent a weighted average of the metric sub-scores calculated in the drive cycle for the defined efficiency metrics. In some implementations, drive-cycle performance scores 335 are used by the operator reward system 195 (e.g., included locally on the vehicle 100 or located remotely) that provides performance bonuses, such as increased permitted speed (e.g., to a pedal speed limit and/or cruise control speed limit), monetary, or other incentives, to reward operators for desirable operator behaviors or positive energy efficiency results. In some examples, the drive-cycle performance score 335 represents a normalized weighted average score for providing equitable scoring of operator behavior across different operating environments and vehicle types.

In some implementations, energy-efficiency performance feedback presented to the operator (and/or fleet management system user) further includes historical performance (trend) scores 304. Historical performance scores 304 may include a graphical representation of an average of drive-cycle performance scores 335 from a plurality of past drive cycles (e.g., a last n drive cycles or a last n drive cycles performed by a particular operator). As depicted in FIG. 3, historical performance scores 304 may be displayed as a bar graph or other graphical representation (e.g., trend of averages) of past drive-cycle performance scores 335.

In some implementations, the intelligent energy-efficiency coach 110 further generates and provides advice-based recommendations 306*a*-306*c* (collectively, recommendations 306) to the operator. For instance, the UI 300 may include one or more recommendations 306 in the format of text sentences. In some examples, the recommendations 306 may be presented with the cumulative metric sub-score feedback. Recommendations 306 may be triggered based on various predefined permutations of metric sub-scores (e.g., a cumulative acceleration metric sub-score that is within a first range, a cumulative braking metric sub-score that is within a second range, and a cumulative regenerative braking metric sub-score that is within a third range may trigger a first recommendation 306*a*). In some examples, the recommendations 306 may be further determined based on predefined permutations of operator behaviors of interest used to quantify the metric sub-scores. In some examples, the recommendations 306 are configured to provide positive reinforcement and advice for operator behavior improvement.

Various example recommendations 306 for various acceleration, braking, and regenerative braking metric sub-score permutations include: "Great job starting and braking smoothly while recovering energy from regenerative braking;" "Great job starting and braking smoothly. Try increasing the regenerative braking setting to recover more energy;" "Smooth accelerations. Try anticipating braking and increasing the regenerative braking setting to recover more energy;" "Great energy recovery from braking and regenerative braking. Try smoother accelerations to reduce energy usage;" "Good braking style. Try smoother accelerations and increase the regenerative braking setting to recover more energy;" "Try smooth accelerations, anticipate braking, and increase the regenerative braking setting to spend less and recover more energy;" "Great job starting smoothly and using regenerative braking. Try anticipating braking to recover more energy;" and "Good use of regenerative braking. Try smooth accelerations and anticipate braking for even more energy recovery."

Some example recommendations 306 corresponding to various accessory power metric sub-score ranges include: "Great job on cab climate and not using excess accessory power;" "Good job on cab climate and not using excess accessory power;" "Average power usage from cab temperature or accessories;" "Try to reduce power usage from either cab climate or accessories;" and "You are using a lot of power, either from cab climate or to run accessories." Additionally, various example recommendations 306 that may be provided in association with various cruise control metric sub-score ranges include: "Great job using cruise a lot;" "Good cruise usage;" "Your cruise control usage is average;" "Use cruise control more to optimize power usage;" and "Turn on cruise control more to optimize power usage." Additional and/or alternative recommendations 306 are contemplated.

Figure 4:
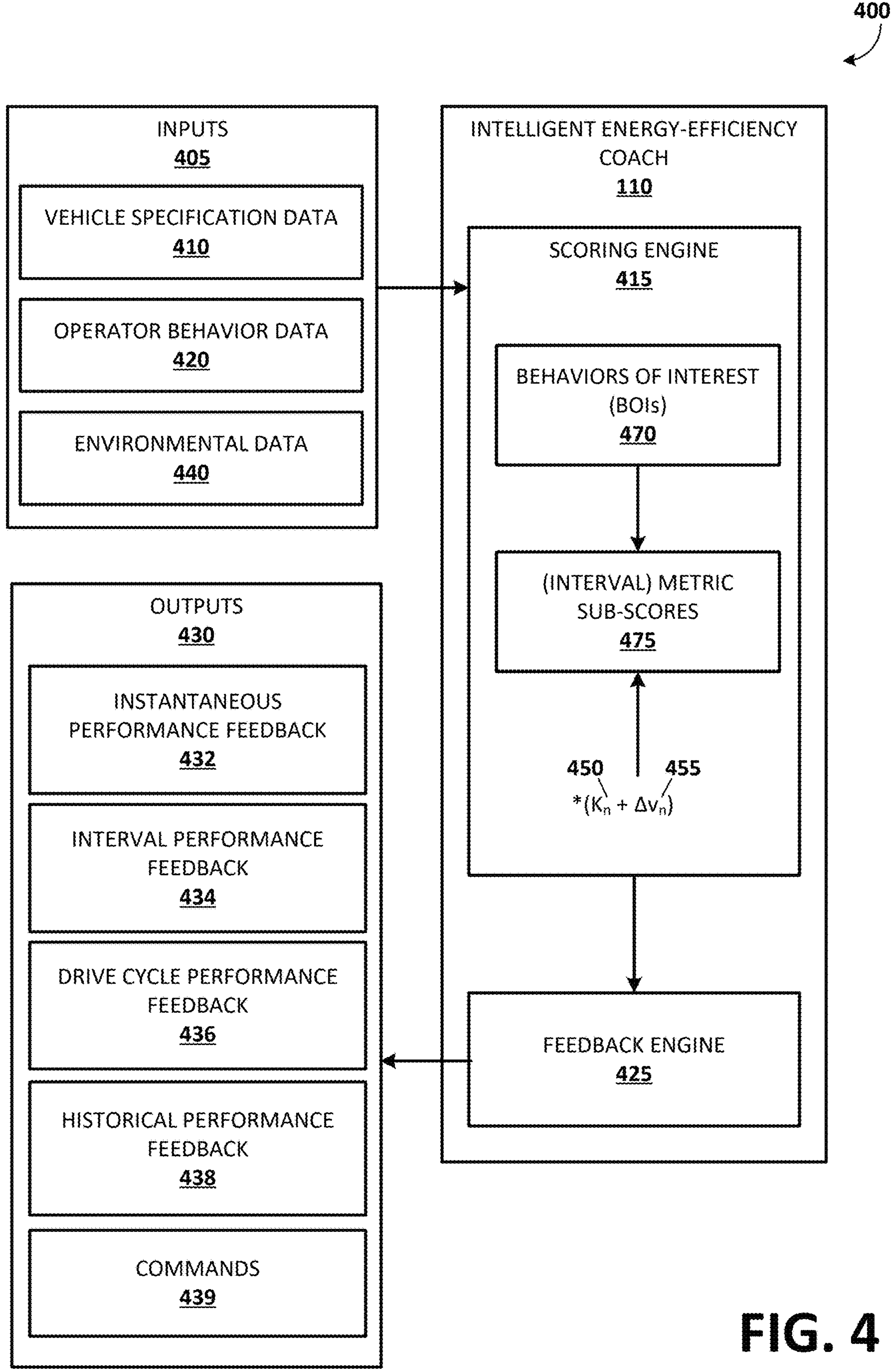
FIG. 4 is a diagram of various inputs and outputs of the intelligent energy-efficiency coach according to an example.

With reference now to FIG. 4, inputs 405, outputs 430, and various processes performed by the intelligent energy-efficiency coach 110 are described in further detail. As depicted, the intelligent energy-efficiency coach 110 receives various types of inputs 405 related to the vehicle 100, operation of the vehicle 100, and the environment in which the vehicle 100 is operating. The inputs 405 may include vehicle specification data 410, operator behavior data 420, and environmental data 440. In examples, the intelligent energy-efficiency coach 110 includes a scoring engine 415 that receives and monitors operator behavior data 420 for operator behaviors of interest (BOIs) 470. According to examples, operator behavior data 420 characterizes operator behaviors (e.g., actions) associated with defined efficiency metrics. For instance, acceleration data, braking data, regenerative braking data, accessory power usage data, and cruise control usage data collected from various sensors 120 may be monitored for BOIs 470 related to aggressive acceleration, hard braking, energy recovery from use of regenerative braking, accessory power usage, utilization of cruise control, etc.

In some examples, the intelligent energy-efficiency coach 110 includes a feedback engine 425 that provides various outputs 430. Outputs 430 may be based on determinations made by the intelligent energy-efficiency coach 110 and provided as a visual notification, an audible alert, and/or a vibration provided via one or more operator interfaces 150, a notification, and/or data or commands 439 sent to a connected device or server, etc. In some examples, visual cues, such as graphical indicators, diagrams, text, icons, and the like, may be used to communicate energy efficiency performance information and other determinations made by the intelligent energy-efficiency coach 110 to the operator and/or a fleet management system user. In some examples, the fleet management system 190 may broadcast one or more types of outputs 430 to one or more vehicles 100 in the fleet and/or to operator communication devices as part of a gamification strategy or system. For instance, operators may interact with one another through friendly competition in pursuit of more energy-efficient operating behaviors. In some examples, commands 439 provide an automated effect on the vehicle 100, such as adjusting a mechanical or software-controlled speed or acceleration governor. As an example, if evaluation of BOIs 470 indicate the operator is performing well (e.g., improving energy efficiency performance), a command 439 may cause the vehicle 100 to switch to a different pedal map to allow the vehicle 100 to react more swiftly to requests for acceleration by the operator.

In examples, outputs 430 may include various forms of feedback (e.g., instantaneous performance feedback 432, interval performance feedback 434, drive-cycle performance feedback 436, and/or historical performance feedback 438) that guide operator behavior using positive reinforcement to improve energy efficiency of the vehicle 100. For instance, instantaneous performance feedback 432 may include instantaneous feedback indicators 232 (shown in FIG. 2) to report a BOI 470 to the vehicle operator. The instantaneous performance feedback 432 may allow the operator to adjust or continue their actions based on the feedback. In other examples, a detected BOI 470 may contribute, as a measure of energy efficiency of operator behavior, to the computation of a metric sub-score 475 for an associated efficiency metric and subsequent interval- and drive cycle-based performance scores determined based on calculated metric sub-scores 475.

As described above, metric sub-scores 475 may be used to determine a performance score for the drive cycle (e.g., a drive-cycle performance score 335), which may be used by an operator reward system to reward operators for desirable operator behaviors or positive energy efficiency results. According to an aspect, operator behavior may vary based on various factors. For instance, operator behavior may be influenced by different vehicle configurations, environmental factors, and/or varying infrastructures and driving styles influenced by driving trends in different regions or particular drive cycle. Thus, a same method of scoring operator behavior across different vehicle types and/or vehicle operators may not be equitable. Accordingly, the scoring engine 115 responds to variability in operator behaviors by using a scoring algorithm to normalize calculated metric sub-scores 475 using tunable variables 455 to bias the weighting constants 450 assigned to the efficiency metrics in calculation of the drive-cycle performance score 335. The tunable variables 455 may be determined based on features of interest identified in vehicle specification data 410, environmental data 440, and/or patterns of operator behavior data 420. In examples, a feature of interest refers to a specific element, attribute, or pattern of data that is relevant for analyzing, evaluating, and/or predicting energy efficiency of the vehicle 100 based on defined efficiency metrics.

In examples, the scoring engine 415 receives and monitors operator behavior data 420 characterizing operator behaviors (e.g., operator actions) associated with defined efficiency metrics. In some implementations, operator behavior data 420 associated with the acceleration efficiency metric may include throttle input data indicating status of application (e.g., on or off) of the throttle and rate of application. When the throttle status is on, the vehicle 100 may either be accelerating or maintaining speed. When the throttle status is off, the vehicle 100 may be coasting, decelerating, or at rest. The rate of application of throttle input may characterize how aggressively the operator accelerates and may positively or negatively impact energy efficiency performance. For instance, a higher rate of throttle application may correspond to more aggressive acceleration (e.g., "flooring it") and a slower, more gradual application of the throttle may indicate smoother, less aggressive acceleration. In examples, a same throttle application may result in different performance based on a pedal/throttle map that is used. For instance, the pedal map may define how pedal pressure is translated into an amount of power sent to the electric motor from the battery. Different pedal maps may correspond to different driving modes (e.g., economy, sport, normal), each providing a distinct driving experience. In further examples, the pedal map may be selected/implemented based on a command 439 determined based on operator performance. In yet further examples, the command 439 is determined based on a reward. Throttle application rates may be monitored by the scoring engine 415 for detecting aggressive acceleration BOIs 470. A BOI 470 may include a single action or a plurality of actions.

With reference to FIG. 5, some example BOIs 470*a*-470*l* (collectively, BOIs 470) are shown that may be defined for evaluating operator behavior data 420 and quantifying the defined efficiency metrics 502*a*-502*e* (collectively, efficiency metrics 502). In examples, a BOI weight 506*a*-5061 (collectively, BOI weight 506) may be assigned to each BOI 470 that corresponds to the BOI's relative impact on a metric sub-score 475 determined for the efficiency metric 502 being evaluated. According to examples, BOI weights 506 that are used to calculate metric sub-scores 475 may be used as a starting default value that is subject to dynamic change based on additional inputs 405. For instance, the intelligent energy-efficiency coach 110 may use additional inputs 405, such as vehicle specification data 410, variable environmental data 440, and/or a pattern of operator behavior data 420, to normalize the contribution of particular operator BOIs 506 to one or more metric sub-scores 475. Such accommodation to changes may be performed using a tunable variable ($\Delta v_n$) 455 applied to one or more weighting constants $K_n$ 450 (e.g., $K_n = K_n + \Delta v_n$) in calculation of the drive-cycle performance score 335.

In examples, for the acceleration efficiency metric 502*a*, the scoring engine 415 may monitor throttle input data for detecting occurrences of a first BOI 470*a* and/or a second BOI 470*b* related to aggressive acceleration (e.g., acceleration actions where the throttle application rate is above an application rate threshold). In some examples, the first BOI 470*a* may correspond to a number of aggressive acceleration actions identified in a city driving environment in comparison with a city-based threshold (e.g., ten aggressive acceleration actions). In further examples, the second aggressive acceleration BOI 470*b* corresponds to a number of aggressive acceleration actions identified in a highway driving environment in comparison with a highway-based threshold (e.g., three aggressive acceleration actions). In examples, the city-based aggressive acceleration threshold may be higher than the highway-based aggressive acceleration threshold to account for city driving environment conditions, where the operator may need to accelerate and decelerate more frequently (e.g., due to traffic lights, stop signs, pedestrian crossings, and/or traffic) versus highway driving environment conditions, which typically involves maintaining a steady vehicle speed for an extended period.

In some examples, the intelligent economy performance coach 110 may monitor vehicle speed data over time, route, and/or traffic data to determine city versus highway driving environments. In further examples, machine learning techniques are employed to evaluate vehicle speed data, other sensor data, route information, etc., to determine when the vehicle 100 is operating in a city versus highway driving environment. According to an aspect, different BOIs 470 may contribute different amounts to the acceleration metric sub-score 475. For instance, contribution of the first BOI 470*a* to the acceleration metric sub-score 475 corresponds to a first BOI weight 506*a* (e.g., 65%) and contribution of the second BOI 470*b* to the acceleration metric sub-score 475 corresponds to a second BOI weight 506*b* (e.g., 35%). In other examples, additional and/or alternative BOIs 470 are evaluated and used to determine the acceleration metric sub-score 475. In further examples, different values are assigned to the first 506*a* and/or second BOI weights 506*b*.

In some implementations, operator behavior data 420 associated with the braking efficiency metric 502*b* may include brake input data indicating status of application (e.g., on or off) of the brake and rate of application. The rate of application of brake input may characterize how aggressively the operator brakes, where a higher rate of brake application may correspond to more aggressive braking (e.g., hard braking or an urgent stop) and a slower, more gradual application of the brake may indicate gentler, more controlled braking. In examples, braking application rates may be monitored by the scoring engine 415 for detecting hard braking actions and/or when the operator may be riding the brakes (e.g., where the operator may be braking when the vehicle 100 is not actively slowing down or stopping), which may negatively impact energy efficiency performance.

In some examples, the scoring engine 415 may evaluate the braking efficiency metric 502*b* based on monitoring operator behavior data 420 for occurrences of a third BOI 470*c*, a fourth BOI 470*d*, and/or a fifth BOI 470*e* to quantify operator behaviors (e.g., actions) related to how often the operator brakes, how often the operator allows the vehicle 100 to coast (e.g., no throttle or brake input), and how often the operator brakes aggressively. For instance, the scoring engine 415 may use occurrences of the third BOI 470*c*, fourth BOI 470*d*, and/or fifth BOI 470*e* to calculate a metric sub-score 475 for the braking efficiency metric 502*b*.

In some examples, the third BOI 470*c* may correspond to throttle-off time (e.g., where the throttle status is off prior to a subsequent throttle-on event or where the throttle status is off prior to a subsequent brake-on event). Throttle-off time may allow the scoring engine 415 to identify when and measure how often the operator allows the vehicle 100 to coast, where the vehicle's motion may be maintained with minimal energy consumption. In examples, contribution of the third BOI 470*c* to the braking metric sub-score 475 corresponds to a third BOI weight 506*c* (e.g., 70%).

In examples, the fourth BOI 470*d* scored by the scoring engine 415 corresponds to a count of identified hard braking actions (e.g., braking actions where the brake application rate and/or deceleration rate is above an upper braking threshold). In examples, contribution of the fourth BOI 470*d* to the braking metric sub-score 475 corresponds to a fourth BOI weight 506*d* (e.g., 20%). For instance, the frequency count of hard braking events may indicate the operator's anticipation of slowing/stopping events.

In some examples, the scoring engine 415 further monitors durations of braking actions and/or a frequency count of light braking actions (e.g., braking actions where the brake application rate and/or deceleration rate is below a lower braking threshold) to detect occurrences of the fifth BOI 470*e*. The fifth BOI 470*e* may correspond to braking riding behavior (e.g., where the operator may be braking when not actively slowing down or stopping). The fifth BOI 470*e* may contribute to the braking metric sub-score 475 based on a fifth BOI weight 506*e* (e.g., 10%). In other examples, additional and/or alternative BOIs 470 are evaluated and used to determine the braking metric sub-score 475. In further examples, different values are assigned to the third 506*c*, fourth 506*d*, and/or fifth BOI weights 506*e*.

In some implementations, operator behavior data 420 associated with the regenerative braking efficiency metric 502*c* may indicate an amount of energy that is recovered (recuperated) by the regenerative braking system and, if available, settings of the regenerative braking system (e.g., a selected level of regenerated braking). For instance, the regenerative braking system included on the vehicle 100 may provide different modes with varying levels of energy recovery and braking aggressiveness. In a higher-level mode, the regenerative braking system may engage automatically when the accelerator pedal is released, converting more of the vehicle's kinetic energy into electricity for battery recharge. For instance, a higher-level mode may provide stronger braking force and higher energy recovery but may also provide a feeling of abrupt or strong deceleration, which might be perceived by an operator as aggressive (and less desirable) compared to smoother, more gradual deceleration experienced in a lower-level mode of regenerative braking. In a lower-level mode, the regenerative braking force is reduced, resulting in less-aggressive deceleration that may allow the vehicle 100 to coast farther when the throttle is released. In examples, the regenerative braking system mode may be operator-selectable, and the intelligent economy performance coach 110 may be configured to encourage use of the higher-level mode.

In some examples, the scoring engine 415 determines a metric sub-score 475 for the regenerative braking efficiency metric 502*c* based on evaluating operator behavior data 420 (e.g., operator actions) for a sixth BOI 470*f* corresponding to a settings level (e.g., associated with an amount of applied regenerative braking force) of the regenerative braking system. For instance, using a lower-level setting may result in lower energy recovery and using a higher-level setting may result in higher energy recovery. The sixth BOI 470*f* may contribute to the regenerative braking metric sub-score 475 based on a sixth BOI weight 470*f* (e.g., 20%).

In examples, the scoring engine 415 may further determine the metric sub-score 475 for the regenerative braking efficiency metric 502*c* based a seventh BOI 470*g* corresponding to an amount of energy recuperated by the regenerative braking system. The seventh BOI 470*g* may contribute to the regenerative braking metric sub-score 475 based on a seventh BOI weight 506*g* (e.g., 80%). In other examples, additional and/or alternative BOIs 470 are evaluated and used to determine the regenerative braking metric sub-score 475. In further examples, different values are assigned to the sixth 506*f* and/or seventh measure weights 506*g*.

In some implementations, operator behavior data 420 associated with the accessory power efficiency metric 502*d* may indicate an amount of energy that is consumed via usage of equipment/auxiliary systems with which the vehicle 100 is equipped (e.g., ePTO, add-on equipment, and/or other vehicle- or fleet-specific components). In some examples, accessory power usage data may further indicate an amount of energy this is consumed by 12-volt (V) accessories (e.g., infotainment and communication systems, instrumentation and controls, lighting, charging ports). In further examples, accessory power usage data may further include the current cab temperature setting and/or an indication of state (e.g., on or off) of the auto-climate feature of the cab HVAC system. For instance, accessory power usage, cab temperature settings, and use of the auto-climate feature may be monitored by the scoring engine 415 to determine contribution of such operator behaviors (actions) to energy efficiency of the vehicle 100.

In some examples, the scoring engine 415 determines a metric sub-score 475 for the accessory power efficiency metric 502*d* based on various BOIs 470*h*-470*k*. For instance, the scoring engine 415 may use an eighth BOI 504*h* to score operator behavior corresponding to cab temperature settings of the HVAC system. Contribution of the cab temperature settings (e.g., eighth BOI 470*h*) on the accessory power metric sub-score 475 may be represented by an eighth BOI weight 506*h* (e.g., 60%).

In examples, the scoring engine 415 may further determine the metric sub-score 475 for the accessory power efficiency metric 502*c* based on a ninth BOI 470*i* corresponding to use of auxiliary equipment on the vehicle 100. Auxiliary equipment usage may contribute to the accessory power metric sub-score 475 based on a ninth BOI weight 506*i* (e.g., 20%).

In examples, the scoring engine 415 may further determine the metric sub-score 475 for the accessory power efficiency metric 502*c* based on a tenth BOI 470*j* corresponding to use of 12-V accessory power (e.g., charging ports, power outlets, lighting, radios, and/or other electronic components). The tenth BOI 470*j* may contribute to the accessory power metric sub-score 475 based on a tenth BOI weight 506*j* (e.g., 15%).

In examples, the scoring engine 415 may further determine the metric sub-score 475 for the accessory power efficiency metric 502*c* based on an eleventh BOI 470*k* corresponding to whether the auto-climate function is being utilized, which increases energy efficiency of the vehicle 100. In examples, the eleventh BOI 470*k* may contribute to the accessory power metric sub-score 475 based on an eleventh BOI weight 506*k* (e.g., 5%). In other examples, additional and/or alternative BOIs 470 are evaluated and used to determine the accessory power metric sub-score 475. In further examples, different values are assigned to the eighth 506*h*, ninth 506*i*, tenth 506*j*, and/or eleventh BOI weights 506*k*.

In some implementations, operator behavior data 420 associated with the cruise control efficiency metric 502*e* may include cruise control usage input data indicating a state (e.g., on or off) of the vehicle's cruise control system. For instance, use of the cruise control system may contribute to energy efficiency. Duration of use of the cruise control system in a drive cycle may be monitored by the intelligent energy-efficiency coach 110 to determine an impact of cruise control usage on energy efficiency of the vehicle 100.

In some examples, the scoring engine 415 determines a metric sub-score 475 for the cruise control efficiency metric 502*e* based on how often the operator uses the cruise control system. For instance, a twelfth BOI 470*l* may correspond to the amount of time the cruise control system is in the on state. The twelfth BOI 470*l* may contribute to the cruise control metric sub-score 475 based on a twelfth BOI weight 506*l* (e.g., 100%). In other examples, additional and/or alternative BOIs 470*l* are evaluated and used to determine the cruise control power metric sub-score 475. In further examples, a different value is assigned to the twelfth measure weight 506*l*.

With reference again to FIG. 4, vehicle-specific inputs 405 may be received or otherwise accessed by the intelligent energy-efficiency coach 110. Vehicle specification data 410 may include information about customizable options with which the vehicle 100 is configured. For instance, the vehicle 100 may be configured with various customizable options associated with the vehicle's powertrain, axle configuration, installed equipment, accessories, regenerative braking system, cruise control system, etc., that can impact energy efficiency of the vehicle 100. Additionally, various dynamic vehicle parameters (e.g. vehicle mass) are also considered in assessing energy usage. In examples, vehicle-specific inputs 405 include vehicle specification data 410 stored in on-board memory and/or obtained from an information source 170 (e.g., a cloud-deployed sales tool database).

In some implementations, vehicle specification data 410 includes information about various features of interest, such as a type and configuration of powertrain (e.g., EV, BEV, PHEV, HEV, or FCEV) and the axle configuration (e.g., 6×4, 4×2, 8×4) included on the vehicle 100. For instance, the powertrain and axle configuration may impact longitudinal control and produce different energy efficiency ratings. In examples, the scoring engine 415 may use powertrain configuration information to normalize the impact of longitudinal control on efficiency performance to accommodate such variability.

In further examples, vehicle specification data 410 includes information about equipment/auxiliary systems with which the vehicle 100 is equipped (e.g., ePTO, add-on equipment, and/or other components). Use of such equipment may impact accessory power usage and overall energy use of the vehicle 100. In some examples, accessory power usage information may trigger the intelligent energy-efficiency coach 110 to provide feedback that informs the operator of, for instance, an impact use of ePTO has on energy efficiency (e.g., a refrigerator application where additional heating or cooling loads may be reduced given certain ambient conditions). Additionally, in some examples, the accessory power metric sub-score 475 may be normalized to reduce the impact of ePTO utilization on the drive-cycle performance score 335. Thus, operator behavior related to executing a function for which the vehicle 100 is intended may not be penalized. For instance, weighting constants ($K_n$) 450 are biased using a tunable variable ($v_n$) 455 to minimize the impact of necessary operator behaviors to a calculated drive-cycle performance score 335. According to an aspect, biasing the weighting constants ($K_n$) 450 results in a more equitable assessment of operator's contribution to energy efficiency and mitigates risk of dismissal by the operator.

In further examples, vehicle specification data 410 includes information about a type of cruise control system that is installed on the vehicle 100. In some examples, the cruise control system is a standard cruise control that provides speed maintenance only. In other examples, the cruise control system is an adaptive cruise control (ACC) system that integrates the use of sensors, such as radars and cameras, to detect objects in front of it and adjust vehicle speed to ensure proper spacing and reduce the possibility of collisions or the need for hard braking. In other examples, the cruise control system is a predictive cruise control (PCC) system that automatically adjusts a cruise control target speed based on a variety of inputs, such as the vehicle's position relative to a location on a route map, terrain, or slope information, and predicted or predetermined paths to a destination. For instance, a PCC system may use global positioning system (GPS) topography data to modulate vehicle speed in anticipation of up-hills or to maximize energy saving through downhill coasting behavior. In other examples, the cruise control system is a combined ACC/PCC system that uses ACC to adjust the vehicle's speed based on the distance to a lead vehicle and PCC to adjust the vehicle's speed based on the upcoming road conditions. In examples, a PCC system may provide greater energy efficiency in comparison to a standard cruise control system. In examples, the intelligent energy-efficiency coach 110 may use cruise control system information to normalize the difference in energy efficiency provided by different types of cruise control systems. This normalization is implemented through adjustments to tunable variables ($v_n$) 455 affecting the weighting constants ($K_n$) 450 allocated to cruise control metric sub-scores 475.

In some examples, vehicle specification data 410 includes information about whether the vehicle 100 is equipped with a feature to enable/disable regenerative braking and/or adjust a level of regenerative braking. In further examples, the vehicle specification data 410 includes information about whether a brake blending feature is included in the vehicle 100 that allows for an integration of regenerative braking with a traditional friction braking system. For instance, the vehicle 100 may split a brake request between traditional friction braking and regenerative braking, which captures energy during braking and converts it into electricity to recharge the vehicle's battery. In examples, brake blending may provide greater energy recuperation with repeated and/or aggressive braking, where such braking behaviors may be less desirable when the vehicle 100 is not equipped with the brake blending feature. Additional and/or other vehicle specification data 410 may be used as an input 205 to the intelligent energy-efficiency coach 110.

In some implementations, the intelligent energy-efficiency coach 110 further responds to variability in operator behaviors by normalizing calculated metric sub-scores 475 based on inputs 405 about the environment in which the vehicle 100 is operating. In some examples, environmental data 440 includes information related to features of interest, such as the route, topography (e.g., uphill, downhill, or flat ground), traffic, ambient conditions (e.g., temperature, weather, humidity), light levels, road conditions (e.g., wet, icy, dry), traffic conditions, etc. Environmental data 440 may be obtained from various sources, such as sensors 120 included in the vehicle 100, remote information sources 170 (e.g., cloud services and/or GPS providers), etc.

In some implementations, the intelligent energy-efficiency coach 110 receives and uses other features of interest, such as vehicle weight, vehicle speed data as a time-series, etc. In examples, vehicle speed data as a time series is used to characterize city driving conditions versus highway driving conditions. For instance, a determination of whether the vehicle 100 is being operated in city or highway driving conditions, information about known or predicted traffic conditions, and/or other information characterizing the route may be used to adjust expectations for acceleration/braking events, cruise control use, and/or energy recuperation.

In some implementations, the interval 235 and/or drive-cycle performance score 335 may be mathematically represented as:

$$\text{Performance Score} = \sum_{n=1}^{\infty} \frac{((a_1 * (K_1 + \Delta v_1)) + (a_2 * (K_2 + \Delta v_2)) + \ldots + (a_n * (K_n + \Delta v_n))}{n}$$

where:

$$\sum\nolimits_1^n K = 1;$$

$$1 < a_n < 5.5;$$

- $a_n$ represents the metric sub-score 475 for efficiency metrics 502 calculated in the interval/drive cycle;
- $K_n$ represents a corresponding weighting constant 250 such metric sub-score ($a_n$) 475 has in calculating the interval/drive-cycle performance score 235/335;
- $\Delta v_n$ represents a tunable variable 455 applied to the weighting constant $K_n$ 450; and
- n represents the total number of metric sub-scores 475 that are combined and averaged to compute the interval/drive-cycle performance score 235/335.

In some examples, the intelligent energy-efficiency coach 110 determines tunable variables 455 based on moving window learning. The intelligent energy-efficiency coach 110 may use reinforcement learning techniques (e.g., temporal differencing (TD) and n-step TD) on various inputs 405 to calculate one or more tunable variables 455 and adjust one or more metric sub-scores 475 on an ad hoc basis. As an example, the weighting constant 450 applied to an acceleration metric sub-score 475 may be adjusted to normalize aggressive acceleration in light of other factors (e.g., a correlation between high acceleration rates and high deceleration rates and/or a potential need for high acceleration rate requests for heavily loaded vehicles 100). As another example, the weighting constant 450 applied to an accessory power metric sub-score 475 may be adjusted to normalize the impact of a particular cab temperature setting on the drive-cycle performance score 335 in environments where ambient temperatures may necessitate use of such cab temperature settings for regulating climate comfort in the cab 130. As another example, weather condition and/or forecast data may be used to adjust the impact of not using the cruise control system on the drive-cycle performance score 335 in certain types of weather-related conditions, such as rainy or icy conditions. In some examples, operator acceleration/deceleration behavior may be preferred (e.g., more energy efficient) to standard cruise control use. Such examples may be identified by comparing energy saving over the same drive cycle or route to adjust the contribution of the acceleration and/or deceleration metric sub-scores 475 to the drive-cycle performance score 335. In further examples, vehicle speed may be evaluated as a time-series to characterize driving conditions (e.g., city driving conditions versus highway driving conditions) to adjust corresponding efficiency metric weightings. Additionally, traffic conditions may help to provide context about the nature of the route for adjusting expectations for acceleration/braking events, cruise control use, and/or regenerative braking energy recuperation. As another example, the intelligent energy-efficiency coach 110 may use vehicle specification data 410 associated with regenerative braking to normalize the difference in energy efficiency provided by brake blending in equipped vehicles 100.

Figure 6:
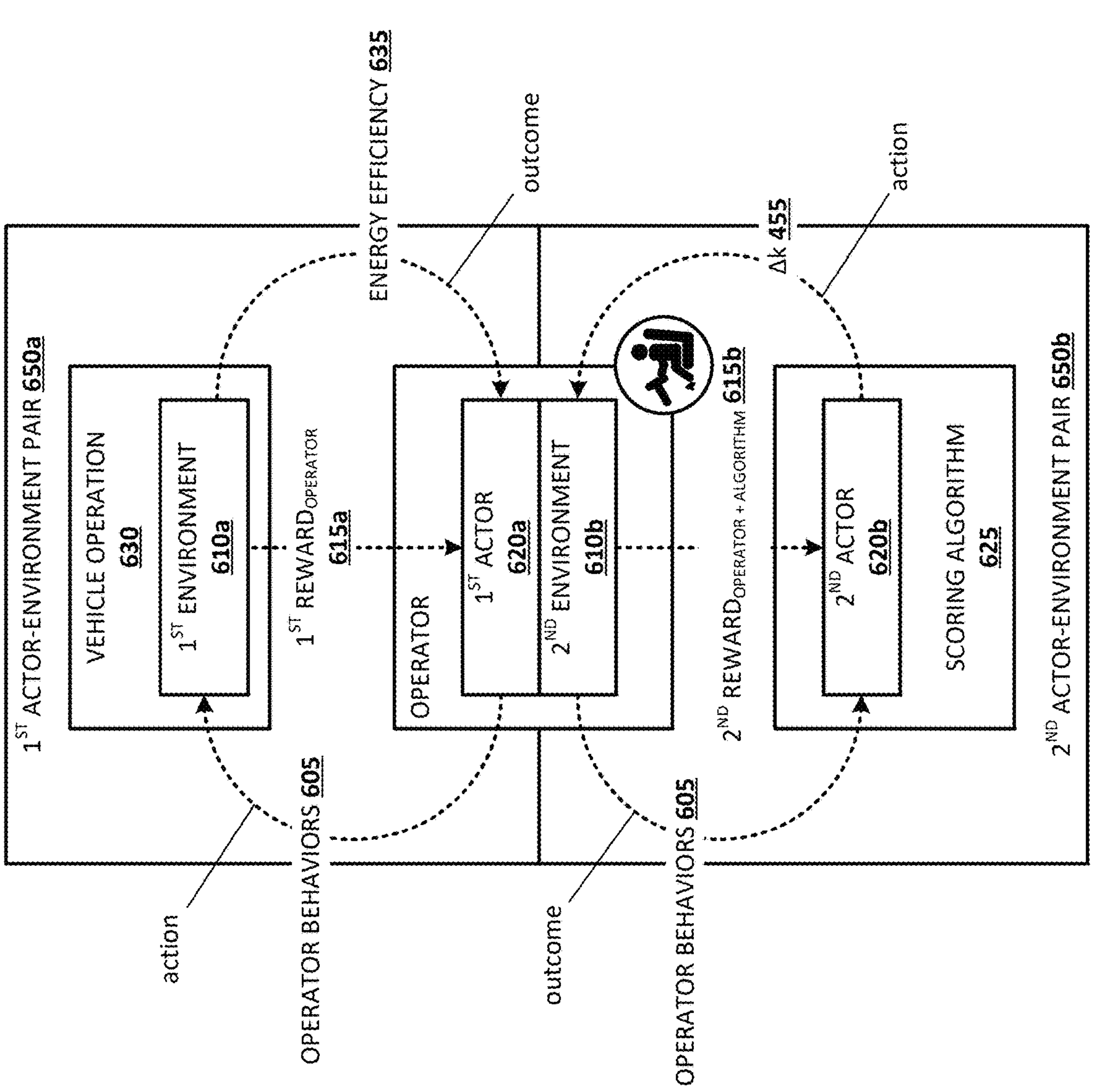
FIG. 6 is a diagram of an example reinforcement learning method for providing intelligent energy-efficiency performance coaching according to an example.

With reference now to FIG. 6, an example reinforcement learning method 600 for providing intelligent energy-efficiency performance coaching is depicted. In examples, the method 600 includes a first actor-environment pair 650*a* and a second actor-environment pair 650*b*, where the actor 620 of each pair represents the one taking an action and the environment 610 represents the one affected by the action.

In the first actor-environment pair 650*a*, the vehicle operator, acting as the first actor 620*a*, interacts with the vehicle 100 by performing various operator actions/behaviors 605. For instance, the operator behaviors 605 may correspond to acceleration, braking, regenerative braking utilization, accessory power utilization, and/or cruise control utilization, which affects a first environment (e.g., operation of the vehicle 100, referred to as vehicle operation 630). In examples, operator behaviors 605 affect vehicle operation 630, which impacts energy efficiency 635 of the vehicle 100.

In examples, a first reward 615*a* is provided to the operator as a measure of the operator behaviors 605 aligning with a desired outcome (e.g., increased energy efficiency 635). In some examples, the first reward 615*a* may represent feedback provided to the operator about energy-efficiency performance (e.g., determined by the intelligent energy-efficiency coach 110). For instance, the feedback may be provided in the form of instantaneous performance feedback 432 (e.g., instantaneous performance indicators 232), interval performance feedback 434 (e.g., interval performance scores 235 and/or metric sub-scores 475), drive cycle performance feedback 436 (e.g., drive-cycle performance scores 335, cumulative metric sub-scores, and/or recommendations 306, and/or historical performance feedback 438 (e.g., historical performance scores 304). In some implementations, historical performance scores 304 represent a trend of the average score over a last N drive cycles. In some implementations, the feedback may be provided in the form of a command 439 that causes an automated effect on the vehicle 100, such as adjusting a mechanical or software-controlled speed or acceleration governor. One or more pieces of feedback may be calculated based on weighting constants 450. In some examples, the weighting constants 450 may be adjusted by one or more tunable variables 455, which biases the feedback provided to the operator. The operator behaviors 605 may be shaped by the first reward 615*a*, leading to changes in how the operator interacts with the first environment 610*a* and, thus, leading to changes to energy efficiency 635.

In the second actor-environment pair 650*b*, a scoring algorithm 625 used by the scoring engine 415 to calculate various energy-efficiency performance scores operates as a second actor 620*b* that interacts with a second environment 610*b*. The second environment 610*b* in the second actor-environment pair 650*b* is the operator of the vehicle 100. A second reward 615*b* may represent feedback the scoring algorithm 625 receives for taking an action (e.g., adjusting a tunable variable 455). For instance, the action of adjusting the tunable variable 455 may cause an effect, such as adjusting operator behaviors 605 that negatively impact energy efficiency 635 to increase energy efficiency 635.

The value of the tunable variable 455 may be determined through a process of optimization including iteratively adjusting the value of the tunable variable 455 to maximize a second reward 615*b*. In examples, the second reward 615*b* is provided to the scoring algorithm 625 as a measure of the tunable variable adjustments aligning with a desired outcome (e.g., increased energy efficiency 635). In some examples, the second reward 615*b* may represent feedback provided to the scoring algorithm 625 about energy-efficiency performance. For instance, the feedback may be provided in the form of metric sub-scores 475, interval performance scores 235, drive-cycle performance scores 335, and/or another reward signal that guides a reinforcement learning process of which types of adjustments made to weighting constants 450 via the tunable variables 455 optimize the operator's energy efficiency behaviors and should be repeated in similar future situations. One or more optimization techniques (e.g., grid search, random search, Bayesian optimization, adaptive methods, etc.) may be used to tune the tunable variables 455. The scoring algorithm 625 may be adaptable to various types of vehicles 100, regardless of operator or location by continuously adjusting tunable variable values based on energy efficiency performance and learning progress of the operator. For instance, the reinforcement learning method 600 may enable both the operator and the scoring algorithm 625 to learn and adapt their actions for better outcomes.

In some implementations, artificial intelligence (AI) language models may be integrated to compare operator responses to feedback and to tailor communication of feedback to produce operator response that improve energy efficiency 635 of the vehicle 100. In some examples, operator responses may be analyzed to determine whether the operator is paying attention to and/or responding effectively to feedback. Tailoring communication of feedback may include adjusting the frequency and/or timing of instantaneous performance indicators 232, frequency and/or wording of recommendations 306, etc., to emphasize BOIs 470 (corresponding to providing instantaneous performance feedback 432) or prioritize recommendations 306 that are working over others that may be ignored.

In some examples, integration of AI language models may further be used to improve feedback provided to the operator, such as by tailoring recommendations 306 to the operator's linguistic or cultural context. Some operators may perceive such feedback to be more inclusive and the intelligent energy-efficiency coach 110 to be more interactive.

In further examples, machine learning may be used to identify operator behavior data 420 that represents certain operator behaviors 605 and to determine whether the identified operator behaviors 605 are characteristic or anomalous. For instance, machine learning may be used to distinguish between normal and unusual operator behaviors 605, particularly in relation to the context or environment in which the driving is occurring, which can be useful for identifying patterns of operator behavior 605.

In some implementations, multiple operators in a fleet may use the same vehicle 100. In some examples, the vehicle 100 includes functionality for the operator to log in or register with the vehicle 100 to link operator behaviors 605 performed in a drive cycle to the particular operator. Registering with the vehicle 100 may be implemented through various methods, such as selecting a driver/operator profile, entering an identifier associated with the operator, detection via a mobile device, Near Field Communication (NFC), biometric recognition, or other identification technologies. In other examples, where such features are not available, other data may be used and evaluated to detect patterns of operator behaviors 605 to identify different operators and link particular operator behaviors 605 performed in a drive cycle to an identified operator. For instance, data such as changes to operator interface preferences or an infotainment system, data collected by an Electronic Logging Device (ELD) system or observation of prolongated hours of driving may be used to determine the vehicle 100 may be shared by multiple operators. Machine learning may be employed to isolate patterns of vehicle operation 630 to link operator behaviors 605 performed in a drive cycle to the respective operators. In further examples, machine learning may be leveraged to isolate operator behavior 605 employed by a same operator across a mixed drive cycle (e.g., including city- and highway-driving conditions). Operator behavior data 420 may be assessed separately for the different portions of the route for energy-efficient operator behaviors 605, which may then be weighted differently to produce a combined overall score (e.g., interval and/or drive-cycle performance score) to enhance equitable scoring.

According to some examples, a gamification system may be implemented across multiple vehicles 100 in a fleet to improve energy efficiency 635 across the fleet. Gamification may include analyzing operator behavior data 420 collected from the multiple vehicles 100. The gamification system implemented in a cloud analytics service 180 and/or the fleet management system 190. In some examples, the gamification system may perform large data mining operations to extract useful information from a large dataset of operator behavior data 420 to normalize performance scores across the vehicles 100 to a common scale so that they can be fairly compared. For instance, different vehicles 100 may operate under different conditions (e.g., different routes, weather conditions, vehicle configurations, load weights, topography, etc.), which can affect an operator's performance scores. By normalizing the scores, comparison of operator behaviors 605 may be fair, where an operator may not be unduly penalized because of factors that may be beyond their control. Score normalization may allow for a fair "competition" among the operators, encouraging them to improve their energy-efficiency performance to further optimize the overall operation of the fleet.

Figure 7:
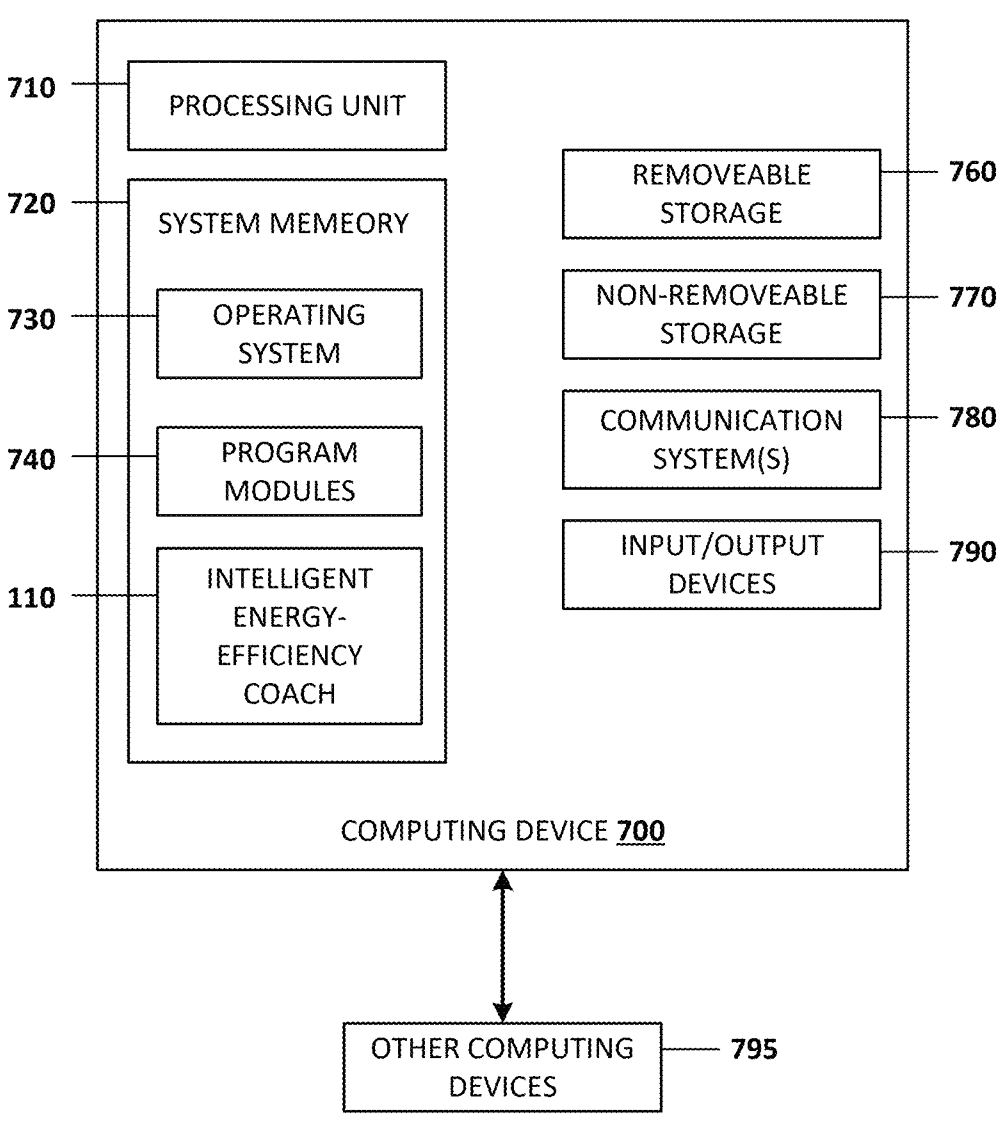
FIG. 7 is a diagram illustrating example physical components of a computing device or system with which examples may be practiced.

FIG. 7 is a system diagram of a computing device 700 according to an example. As shown in FIG. 7, the physical components (e.g., hardware) of the computing device 700 are illustrated and these physical components may be used to practice the various aspects of the present disclosure. The computing device 700 may include at least one processing unit 710 and a system memory 720. The system memory 720 may include, but is not limited to, volatile storage (e.g., random access memory), non-volatile storage (e.g., read-only memory), flash memory, or any combination of such memories. The system memory 720 may also include an operating system 730 that controls the operation of the computing device 700 and one or more program modules 740. The program modules 740 may be responsible for performing one more of the operations of the methods described herein for providing intelligent energy-efficiency coaching. A number of different program modules and data files may be stored in the system memory 720. While executing on the processing unit 710, the program modules 740 may perform the various processes described above. One example program module 740 includes sufficient computer-executable instructions for the intelligent energy-efficiency coach 110.

The computing device 700 may also have additional features or functionality. For example, the computing device 700 may include additional data storage devices (e.g., removable and/or non-removable storage devices) such as, for example, magnetic disks, optical disks, or tape. These additional storage devices are labeled as a removable storage 760 and a non-removable storage 770.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 700 on the single integrated circuit (chip). The disclosure may also be practiced using other technologies capable of performing logical operations such as, for example, AND, OR, and NOT, including but not limited to mechanical, optical, fluidic, and quantum technologies.

The computing device 700 may include one or more communication systems 780 that enable the computing device 700 to communicate with other computing devices 795 such as, for example, routing engines, gateways, signings systems and the like. Examples of communication systems 780 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 700 may also have one or more input devices and/or one or more output devices shown as input/output devices 790. These input/output devices 790 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 720, the removable storage 760, and the non-removable storage 770 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 700. Any such computer storage media may be part of the computing device 700. Computer storage media does not include a carrier wave or other propagated or modulated data signal.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, micro-code, etc.) may provide aspects discussed herein. Aspects may take the form of a computer program product on a computer-usable or computer-readable storage medium having computer-usable or computer-readable program code embodied in the medium for use by, or in connection with, an instruction execution system.

Figure 8A:
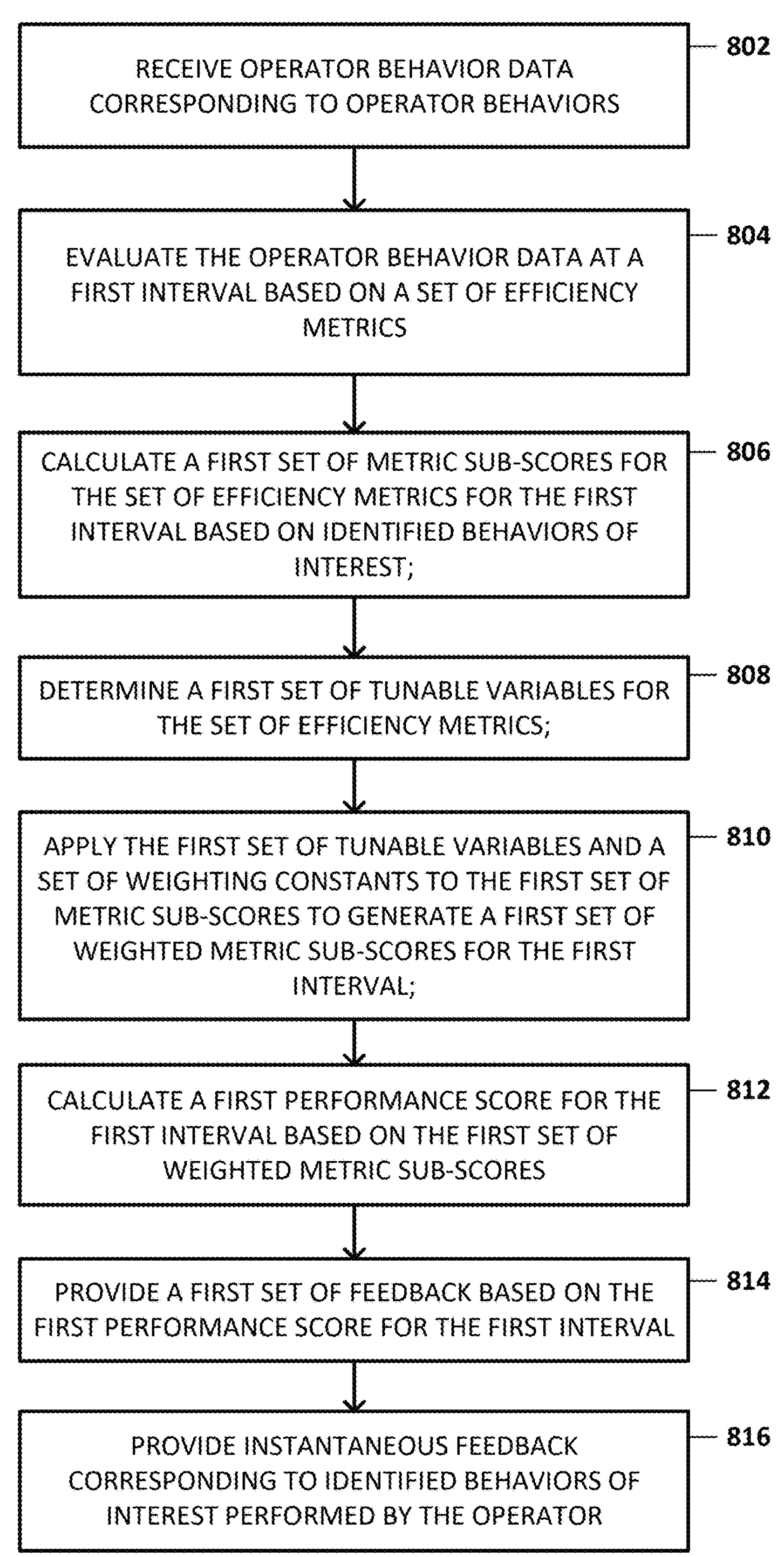
FIGS. 8A-8D depict a flow diagram of a method for providing intelligent energy-efficiency performance coaching according to an example.

FIGS. 8A-8D depict a flow diagram of an example method 800 of providing intelligent energy-efficiency performance coaching according to an example. With reference now to FIG. 8A, the method 800 includes: at operation 802, receiving operator behavior data 420 corresponding to operator behaviors performed throughout a drive cycle of a vehicle 100 that impact the vehicle's energy efficiency; at operation 804, evaluating the operator behavior data at a first interval of the drive cycle based on a set of efficiency metrics 502 to identify BOIs 470 performed by an operator of the vehicle; at operation 806, calculating a first set of metric sub-scores 475 for the set of efficiency metrics for the first interval based on identified behaviors of interest; at operation 808, determining a first set of tunable variables for the set of efficiency metrics; at operation 810, applying the first set of tunable variables and a set of weighting constants 450 to the first set of metric sub-scores to generate a first set of weighted metric sub-scores for the first interval; at operation 812, calculating a first performance score for the first interval (interval performance score 235) based on the first set of weighted metric sub-scores; and at operation 814, providing a first set of feedback (e.g., interval performance feedback 434 and/or commands 439) based on the first performance score for the first interval. In some examples, determining the first set of tunable variables 455 comprises: receiving additional data comprising at least one of: vehicle specification data 410; or environmental data 440; evaluating the specification data or environmental data for features of interest; and calculating each tunable variable 455 in the first set of tunable variables 455 based on identified features of interest. In some examples, the method 800 further comprises: providing instantaneous performance feedback 432 corresponding to identified BOIs 470 performed by the operator.

Figure 8B:
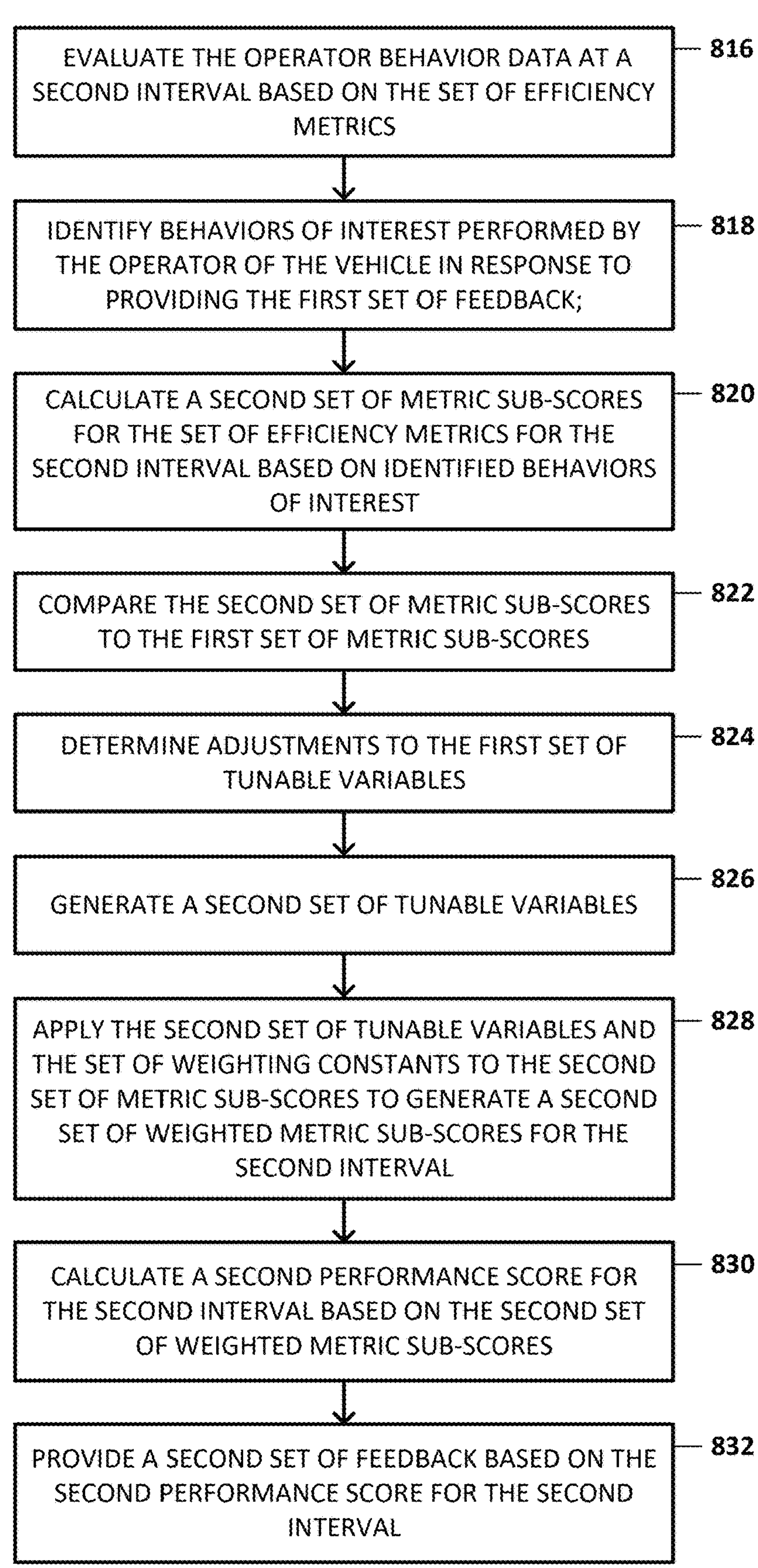

With reference now to FIG. 8B, in some examples, the method 800 further comprises: at operation 816, evaluating the operator behavior data 420 at a second interval of the drive cycle based on the set of efficiency metrics 502 to identify BOIs 470 performed by the operator of the vehicle 100 in response to providing the first set of feedback (e.g., interval performance feedback 434 and/or commands 439); at operation 818, identifying the performed BOIs; at operation 820, calculating a second set of metric sub-scores 475 for the set of efficiency metrics for the second interval based on identified BOIs; at operation 822, comparing the second set of metric sub-scores to the first set of metric sub-scores; at operation 824, determining adjustments to one or more tunable variables 455 in the first set of tunable variables 455 based on the comparison; and at operation 826, applying the adjustments to generate a second set of tunable variables 455. In some examples, the method 800 further comprises: at operation 830, calculating a second performance score for the second interval based on the second set of weighted metric sub-scores; and at operation 832, providing a second set of feedback (e.g., interval performance feedback 434, drive cycle performance feedback 436, and/or commands 439) based on the second performance score (e.g., interval performance score 235) for the second interval.

Figure 8C:
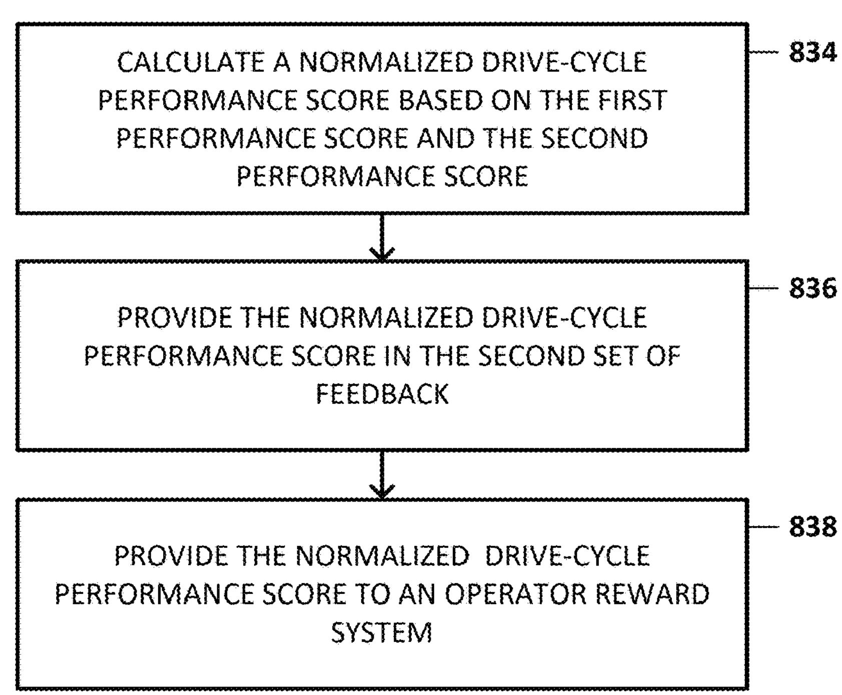

With reference now to FIG. 8C, in some examples, the method 800 further comprises: at operation 834, calculating a normalized drive-cycle performance score 335 based on the first performance score and the second performance score; at operation 836, providing the normalized drive-cycle performance score in the second set of feedback. In some examples, the method 800 further comprises, at operation 838, providing the normalized rive-cycle performance score 335 to an operator reward system 195.

Figure 8D:
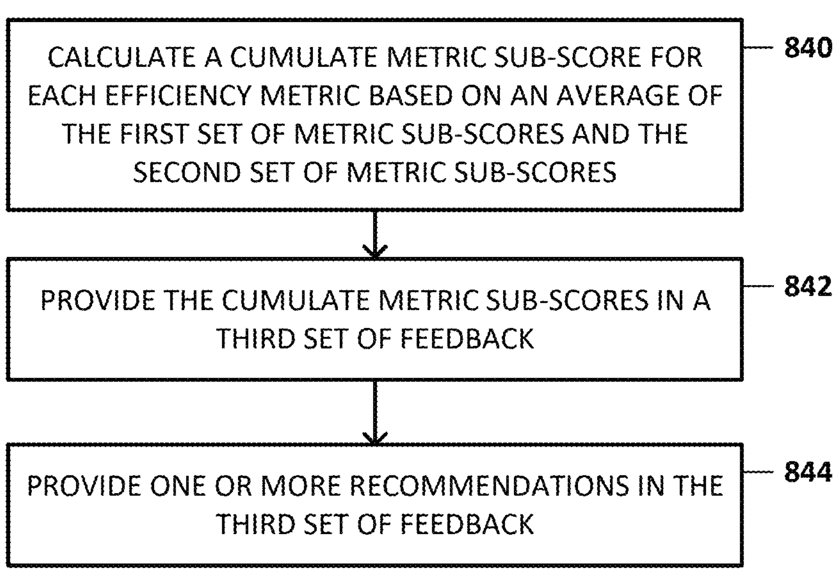

With reference now to FIG. 8D, in some examples, the method 800 further comprises: at operation 840, calculating a cumulative metric sub-score for each efficiency metric 502 based on an average of the first set of metric sub-scores 475 and the second set of metric sub-scores 475; and at operation 842, providing the cumulative metric sub-scores in a third set of feedback (e.g., drive cycle performance feedback 436). In some examples, the method 800 further comprises, at operation 844, providing one or more recommendations 306 in the third set of feedback.

The description and illustration of one or more aspects provided in this application are intended to provide a thorough and complete disclosure of the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A system for providing energy-efficiency coaching, comprising:

at least one processing unit; and a memory including instructions, which when executed by the at least one processing unit, cause the system to perform operations comprising:

receiving operator behavior data corresponding to operator behaviors performed throughout a drive cycle of a vehicle that impact the vehicle's energy efficiency;

evaluating the operator behavior data at a first interval of the drive cycle based on a set of efficiency metrics to identify behaviors of interest performed by an operator of the vehicle;

calculating a first set of metric sub-scores for the set of efficiency metrics for the first interval based on identified behaviors of interest;

determining a first set of tunable variables for the set of efficiency metrics;

applying the first set of tunable variables and a set of weighting constants to the first set of metric sub-scores to generate a first set of weighted metric sub-scores for the first interval;

calculating a first performance score for the first interval based on the first set of weighted metric sub-scores;

providing a first set of feedback based on the first performance score for the first interval; and causing a speed governor or an acceleration governor to be adjusted based on the first set of feedback.

2. The system of claim 1, wherein determining the first set of tunable variables comprises:

receiving additional data comprising at least one of:

vehicle specification data; or environmental data;

evaluating the specification data or environmental data for features of interest; and calculating each tunable variable in the first set of tunable variables based on identified features of interest.

3. The system of claim 1, further comprising:

evaluating the operator behavior data at a second interval of the drive cycle based on the set of efficiency metrics to identify behaviors of interest performed by the operator of the vehicle in response to providing the first set of feedback;

calculating a second set of metric sub-scores for the set of efficiency metrics for the second interval based on identified behaviors of interest;

comparing the second set of metric sub-scores to the first set of metric sub-scores; and adjusting one or more tunable variables in the first set of tunable variables based on the comparison to generate a second set of tunable variables.

4. The system of claim 3, further comprising:

applying the second set of tunable variables and the set of weighting constants to the second set of metric sub-scores to generate a second set of weighted metric sub-scores for the second interval;

calculating a second performance score for the second interval based on the second set of weighted metric sub-scores; and providing a second set of feedback based on the second performance score for the second interval.

5. The system of claim 4, further comprising:

calculating a normalized drive-cycle performance score for the drive cycle based on the first performance score and the second performance score; and providing the normalized drive-cycle performance score in a second set of feedback.

6. The system of claim 5, further comprising providing the normalized drive-cycle performance score to an operator reward system.

7. The system of claim 4, further comprising:

calculating, for each efficiency metric in the set of efficiency metrics, a cumulative metric sub-score based on an average of the first set of metric sub-scores and the second set of metric sub-scores; and providing the cumulative metric sub-scores for the set of efficiency metrics in a third set of feedback.

8. The system of claim 7, further comprising including one or more recommendations to the operator in the third set of feedback.

9. The system of claim 1, further comprising providing instantaneous feedback to the operator corresponding to identified behaviors of interest performed by the operator.

10. The system of claim 9, wherein the instantaneous feedback indicates a positive or negative impact of the identified behaviors of interest on the vehicle's energy efficiency.

11. The system of claim 10, wherein the instantaneous feedback is displayed in association with one or more efficiency metrics in the set of efficiency metrics.

12. The system of claim 1, wherein the set of efficiency metrics comprises at least one of:

an acceleration efficiency metric;

a braking efficiency metric;

a regenerative braking efficiency metric;

an accessory power efficiency metric; or a cruise control efficiency metric.

13. A method for providing energy-efficiency coaching, comprising:

receiving operator behavior data corresponding to operator behaviors performed throughout a drive cycle of a vehicle that impact the vehicle's energy efficiency;

evaluating the operator behavior data at a first interval of the drive cycle based on a set of efficiency metrics to identify behaviors of interest performed by an operator of the vehicle;

calculating a first set of metric sub-scores for the set of efficiency metrics for the first interval based on identified behaviors of interest;

determining a first set of tunable variables for the set of efficiency metrics;

applying the first set of tunable variables and a set of weighting constants to the first set of metric sub-scores to generate a first set of weighted metric sub-scores for the first interval;

calculating a first performance score for the first interval based on the first set of weighted metric sub-scores; and providing a first set of feedback based on the first performance score for the first interval, wherein providing the first set of feedback comprises causing the vehicle to adjust a level of reactivity to requests for acceleration.

14. The method of claim 13, wherein determining the first set of tunable variables comprises:

receiving additional data comprising at least one of:

vehicle specification data; or environmental data;

evaluating the specification data or environmental data for features of interest; and calculating each tunable variable in the first set of tunable variables based on identified features of interest.

15. The method of claim 13, further comprising:

evaluating the operator behavior data at a second interval of the drive cycle based on the set of efficiency metrics to identify behaviors of interest performed by the operator of the vehicle in response to providing the first set of feedback;

calculating a second set of metric sub-scores for the set of efficiency metrics for the second interval based on identified behaviors of interest;

comparing the second set of metric sub-scores to the first set of metric sub-scores; and adjusting one or more tunable variables in the first set of tunable variables to generate a second set of tunable variables.

16. The method of claim 15, further comprising:

applying the second set of tunable variables and the set of weighting constants to the second set of metric sub-scores to generate a second set of weighted metric sub-scores for the second interval;

calculating a second performance score for the second interval based on the second set of weighted metric sub-scores; and providing a second set of feedback based on the second performance score for the second interval.

17. The method of claim 16, further comprising:

calculating a normalized drive-cycle performance score for the drive cycle based on the first performance score and the second performance score; and providing the normalized drive-cycle performance score in at least one of:

a second set of feedback to the operator; or to an operator reward system.

18. A vehicle, comprising an intelligent energy-efficiency coach, comprising:

at least one processing unit; and a memory including instructions, which when executed by the at least one processing unit, cause the intelligent energy-efficiency coach to perform operations comprising:

receiving operator behavior data corresponding to operator behaviors performed throughout a drive cycle of a vehicle that impact the vehicle's energy efficiency;

evaluating the operator behavior data at a first interval of the drive cycle based on a set of efficiency metrics to identify behaviors of interest performed by an operator of the vehicle;

calculating a first set of metric sub-scores for the set of efficiency metrics for the first interval based on identified behaviors of interest;

determining a first set of tunable variables for the set of efficiency metrics;

applying the first set of tunable variables and a set of weighting constants to the first set of metric sub-scores to generate a first set of weighted metric sub-scores for the first interval;

calculating a first performance score for the first interval based on the first set of weighted metric sub-scores;

providing a first set of feedback to the operator including the first performance score for the first interval; and causing a speed governor or an acceleration governor to be adjusted based on the first set of feedback.

19. The vehicle of claim 18, further comprising:

determining the first set of tunable variables comprises:

receiving additional data comprising at least one of:

vehicle specification data; or environmental data;

evaluating the specification data or environmental data for features of interest;

calculating each tunable variable in the first set of tunable variables based on identified features of interest;

evaluating the operator behavior data at a second interval of the drive cycle based on the set of efficiency metrics to identify behaviors of interest performed by the operator of the vehicle in response to providing the first set of feedback;

calculating a second set of metric sub-scores for the set of efficiency metrics for the second interval based on identified behaviors of interest;

comparing the second set of metric sub-scores to the first set of metric sub-scores;

adjusting one or more tunable variables in the first set of tunable variables to generate a second set of tunable variables;

applying the second set of tunable variables and the set of weighting constants to the second set of metric sub-scores to generate a second set of weighted metric sub-scores for the second interval;

calculating a second performance score for the second interval based on the second set of weighted metric sub-scores; and providing a second set of feedback to the operator based on the second performance score for the second interval.

20. The vehicle of claim 19, further comprising:

calculating a normalized drive-cycle performance score for the drive cycle based on the first performance score and the second performance score; and providing the normalized drive-cycle performance score in at least one of:

a second set of feedback to the operator; or to an operator reward system.

* * * * *